United States Patent
Hu et al.

(10) Patent No.: US 11,107,205 B2
(45) Date of Patent: Aug. 31, 2021

(54) TECHNIQUES FOR CONVOLUTIONAL NEURAL NETWORK-BASED MULTI-EXPOSURE FUSION OF MULTIPLE IMAGE FRAMES AND FOR DEBLURRING MULTIPLE IMAGE FRAMES

(71) Applicant: Samsung Electronics Co., Ltd., Suwon-si (KR)

(72) Inventors: Yuting Hu, San Diego, CA (US); Ruiwen Zhen, Allen, TX (US); John W. Glotzbach, Allen, TX (US); Ibrahim Pekkucuksen, Plano, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 16/278,512

(22) Filed: Feb. 18, 2019

(65) Prior Publication Data

US 2020/0265567 A1    Aug. 20, 2020

(51) Int. Cl.
*G06N 3/08* (2006.01)
*G06T 5/50* (2006.01)

(52) U.S. Cl.
CPC ............ *G06T 5/50* (2013.01); *G06N 3/08* (2013.01); *G06T 2207/20081* (2013.01); *G06T 2207/20084* (2013.01); *G06T 2207/20221* (2013.01)

(58) Field of Classification Search
CPC ............ G06T 5/50; G06T 2207/20081; G06T 2207/20084; G06T 2207/20221; G06N 3/08
See application file for complete search history.

(56) References Cited

U.S. PATENT DOCUMENTS

| 7,548,659 B2 * | 6/2009 | Ofek ................. G06T 5/005 348/208.99 |
| 8,848,063 B2 | 9/2014 | Jo et al. |

(Continued)

FOREIGN PATENT DOCUMENTS

| CN | 102665034 A | 9/2012 |
| CN | 103793885 B | 7/2016 |

(Continued)

OTHER PUBLICATIONS

Kim et al., "Online Video Deblurring via Dynamic Temporal Blending Network", Computer Vision Foundation, Apr. 2017, pp. 4038-4047.

(Continued)

*Primary Examiner* — Gregory M Desire

(57) ABSTRACT

A method includes obtaining multiple image frames of a scene using at least one camera of an electronic device. The method also includes using a convolutional neural network to generate blending maps associated with the image frames. The blending maps contain or are based on both a measure of motion in the image frames and a measure of how well exposed different portions of the image frames are. The method further includes generating a final image of the scene using at least some of the image frames and at least some of the blending maps. The final image of the scene may be generated by blending the at least some of the image frames using the at least some of the blending maps, and the final image of the scene may include image details that are lost in at least one of the image frames due to over-exposure or under-exposure.

23 Claims, 19 Drawing Sheets

(56) References Cited

U.S. PATENT DOCUMENTS

| | | | |
|---|---|---|---|
| 9,024,951 | B2 | 5/2015 | Frank et al. |
| 9,117,134 | B1* | 8/2015 | Geiss ..................... G06T 5/40 |
| 9,330,446 | B2 | 5/2016 | Park |
| 9,438,809 | B2 | 9/2016 | Sheikh et al. |
| 10,080,006 | B2* | 9/2018 | Bigioi ................... G06T 7/593 |
| 10,097,765 | B2 | 10/2018 | Sheikh et al. |
| 10,666,873 | B2* | 5/2020 | Bouzaraa ............... G06K 9/627 |
| 10,699,388 | B2* | 6/2020 | Price .................... G06N 3/0454 |
| 10,706,503 | B2* | 7/2020 | Schroers ............... G06T 5/003 |
| 10,708,525 | B2* | 7/2020 | Pourreza Shahri ........................ H04N 5/35581 |
| 2010/0066817 | A1 | 3/2010 | Zomet et al. |
| 2016/0259994 | A1 | 9/2016 | Ravindran et al. |
| 2018/0025257 | A1 | 1/2018 | van den Oord et al. |
| 2018/0137643 | A1 | 5/2018 | Wang |
| 2018/0192098 | A1 | 7/2018 | Pekkucuksen et al. |
| 2019/0306399 | A1 | 10/2019 | Fujinami et al. |

FOREIGN PATENT DOCUMENTS

| | | |
|---|---|---|
| CN | 106934769 A | 7/2017 |
| CN | 107203985 A | 9/2017 |
| JP | 2018064201 A | 4/2018 |
| JP | 6333095 B2 | 5/2018 |
| KR | 101699919 B1 | 1/2017 |
| WO | 2019001701 A1 | 1/2019 |

OTHER PUBLICATIONS

Joshi et al., "Seeing Mt. Rainier: Lucky Imaging for Multi-Image Denoising, Sharpening, and Haze Removal", 2010 IEEE International Conference on Computational Photography (ICCP), Mar. 2010, 8 pages.

Kim et al., "Online Video Deblurring via Dynamic Temporal Blending Network", Computer Vision Foundation, (pp. 4038-4047) 10 pages.

Joshi et al., "Seeing Mt. Rainier: Lucky Imaging for Multi-Image Denoising, Sharpening, and Haze Removal", Microsoft Research, 8 pages.

Kalantari et al. "Deep High Dynamic Range Imaging of Dynamic Scenes", ACM Transactions on Graphics, vol. 36, No. 4, Article 144, Jul. 2017, 12 pages.

Tezcan, "Motion Estimation Using Convolutional Neural Networks", Boston University, Department of Electrical and Computer Engineering, Technical Report No. ECE-2017-04, Dec. 2017, 30 pages.

Gelfand et al., "Multi-exposure Imaging on Mobile Devices", MM'10, Oct. 2010, (pp. 823-826) 4 pages.

Kingma et al., "Adam: A Method for Stochastic Optimization", ICLR 2015, Jan. 2017, 15 pages.

Hasinoff et al., "Burst Photography for High Dynamic Range and Low-Light Imaging on Mobile Cameras", ACM Trans. Graph., vol. 35, No. 6, Article 192, Nov. 2016, (pp. 192-192:12) 12 pages.

Fischer et al., "FlowNet: Learning Optical Flow with Convolutional Networks", May 2015, 13 pages.

Ilg et al., "FlowNet 2.0: Evolution of Optical Flow Estimation with Deep Networks", University of Freiburg, Germany, Dec. 2016, 16 pages.

Zhen et al., "System and Method for Compositing High Dynamic Range Images", U.S. Appl. No. 16/277,630, filed Feb. 15, 2019, 52 pages.

International Search Report and Written Opinion of the International Searching Authority regarding International Patent Application No. PCT/KR2020/000107 dated Apr. 21, 2020, 8 pages.

Eilertsen et al., "HDR image reconstruction from a single exposure using deep CNNs, Supplementary material", ACM Transactions on Graphics, Nov. 2017, 6 pages.

Marnerides et al., "ExpandNet: A Deep Convolutional Neural Network for High Dynamic Range Expansion from Low Dynamic Range Content", Computer Graphics Forum, vol. 37, No. 2, May 2018, 13 pages.

* cited by examiner

1402

1404

1406

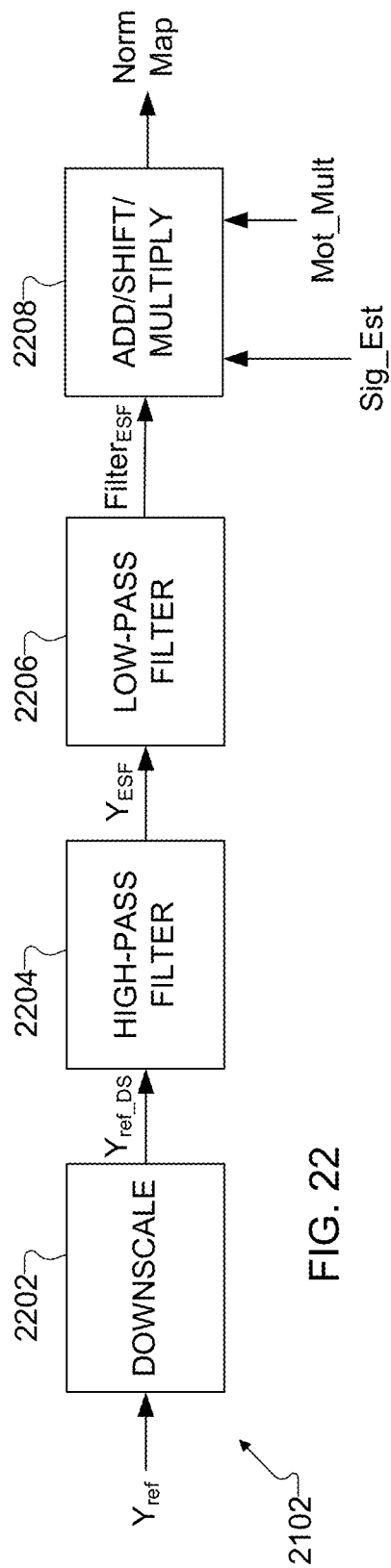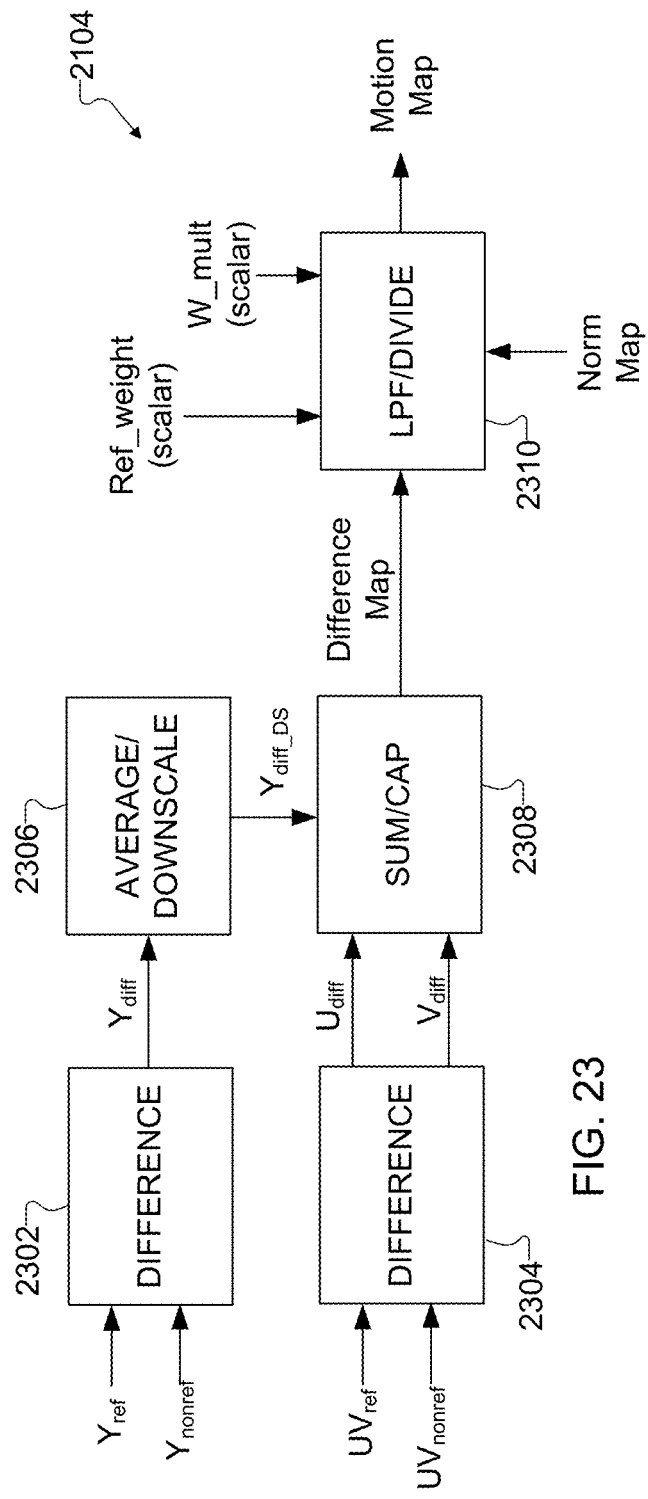
FIG. 22
FIG. 23

TECHNIQUES FOR CONVOLUTIONAL NEURAL NETWORK-BASED MULTI-EXPOSURE FUSION OF MULTIPLE IMAGE FRAMES AND FOR DEBLURRING MULTIPLE IMAGE FRAMES

TECHNICAL FIELD

This disclosure relates generally to image capturing systems. More specifically, this disclosure relates to techniques for convolutional neural network-based multi-exposure fusion of multiple image frames and for deblurring multiple image frames.

BACKGROUND

Many mobile electronic devices, such as smartphones and tablet computers, include cameras that can be used to capture still and video images. While convenient, cameras on mobile electronic devices typically suffer from a number of shortcomings. For example, cameras on mobile electronic devices often capture images with under-exposed or over-exposed regions, such as when capturing images of natural scenes. This is typically because image sensors in the cameras have limited dynamic range. It is possible to capture multiple image frames of a scene and then combine the "best" parts of the image frames to produce a blended image. However, producing a blended image from a set of image frames with different exposures is a challenging process, especially for dynamic scenes. As another example, cameras on mobile electronic devices typically have poor performance in low-light situations. While it is possible to increase the amount of light collected at an image sensor by increasing the exposure time, this also increases the risk of producing blurred images due to object and camera motion.

SUMMARY

This disclosure provides techniques for convolutional neural network-based multi-exposure fusion of multiple image frames and for deblurring multiple image frames.

In a first embodiment, a method includes obtaining multiple image frames of a scene using at least one camera of an electronic device. The method also includes using a convolutional neural network to generate blending maps associated with the image frames. The blending maps contain or are based on both (i) a measure of motion in the image frames and (ii) a measure of how well exposed different portions of the image frames are. The method further includes generating a final image of the scene using at least some of the image frames and at least some of the blending maps.

In a second embodiment, an electronic device includes at least one camera and at least one processing device. The at least one processing device is configured to obtain multiple image frames of a scene using the at least one camera and use a convolutional neural network to generate blending maps associated with the image frames. The blending maps contain or are based on both (i) a measure of motion in the image frames and (ii) a measure of how well exposed different portions of the image frames are. The at least one processing device is also configured to generate a final image of the scene using at least some of the image frames and at least some of the blending maps.

In a third embodiment, a non-transitory machine-readable medium contains instructions that when executed cause at least one processor of an electronic device to obtain multiple image frames of a scene using at least one camera of the electronic device and use a convolutional neural network to generate blending maps associated with the image frames. The blending maps contain or are based on both (i) a measure of motion in the image frames and (ii) a measure of how well exposed different portions of the image frames are. The medium also contains instructions that when executed cause the at least one processor to generate a final image of the scene using at least some of the image frames and at least some of the blending maps.

In a fourth embodiment, a method includes capturing multiple image frames of a scene at different camera exposures using at least one camera of an electronic device. The method also includes determining whether to discard any of the captured image frames based on an amount of blur in the captured image frames. The method further includes identifying portions of the captured image frames prone to blur and blending the image frames that have not been discarded to produce a blended image. In addition, the method includes performing deblurring of the blended image in only the identified portions and performing filtering and motion compensation of the blended image to generate a final image of the scene.

In a fifth embodiment, an electronic device includes at least one camera and at least one processing device configured to perform the method of the fourth embodiment or any of its dependent claims. In a sixth embodiment, a non-transitory machine-readable medium contains instructions that when executed cause at least one processor of an electronic device to perform the method of the fourth embodiment or any of its dependent claims.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 19, 20, 21, 22, and 23 illustrate an example process for performing a motion map generation operation in the process of FIG. 17 in accordance with this disclosure.

DETAILED DESCRIPTION

Figure 1:
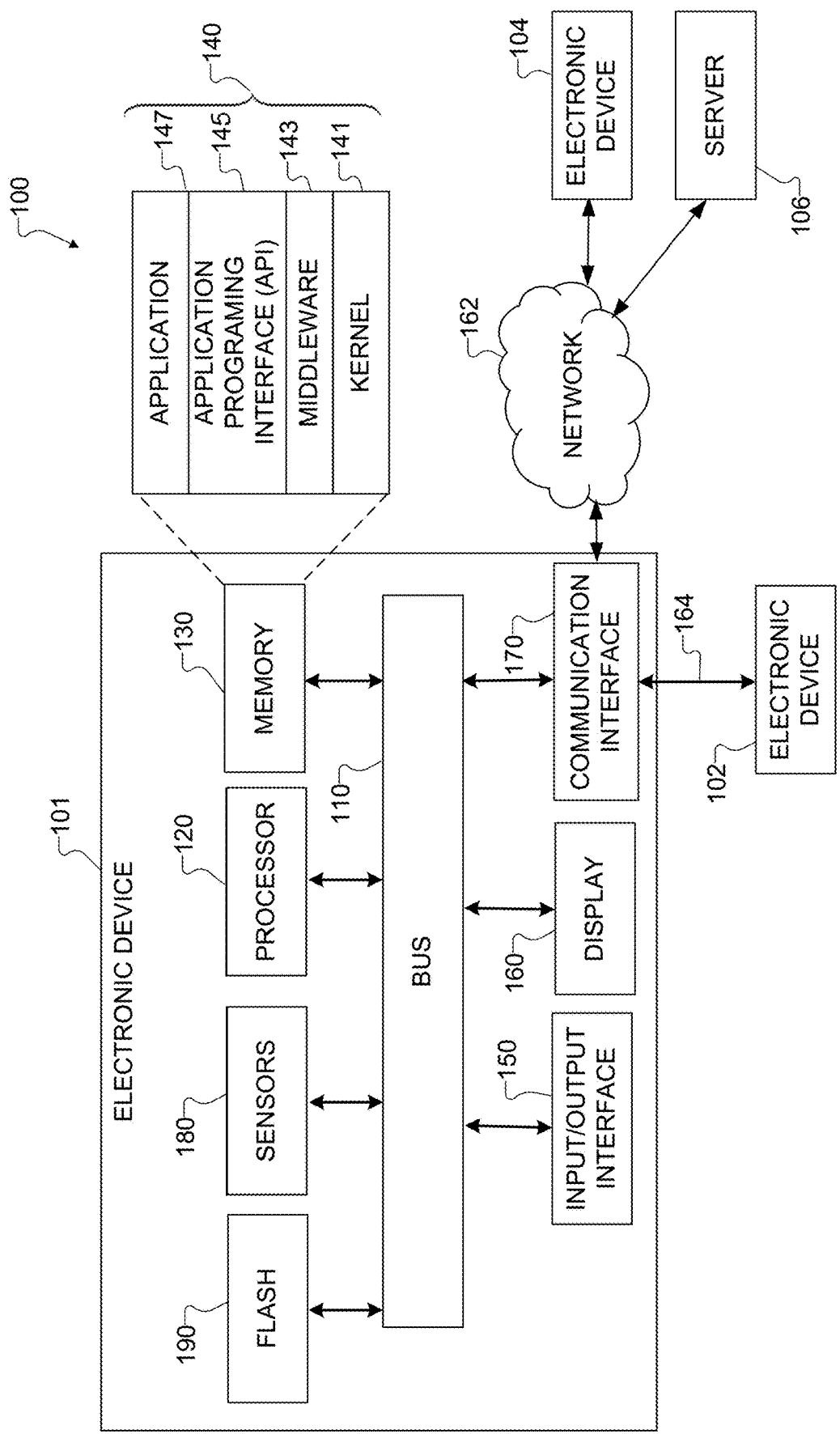
FIG. 1 illustrates an example network configuration including an electronic device in accordance with this disclosure.

FIGS. 1 through 24, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from a number of shortcomings. For example, cameras on mobile electronic devices often capture images with under-exposed or over-exposed regions, typically because image sensors in the cameras have limited dynamic range. It is possible to capture multiple image frames of a scene and then combine portions of the image frames, which is typically guided by a set of quality/reliability measures that can be consolidated into a scalar-valued weight map called a "blending map". However, producing a blended image from a set of image frames with different exposures is a challenging process, especially for dynamic scenes. Among other reasons, this is because the differences between multiple images can have multiple sources, such as motion of an electronic device or camera itself, motion of objects within a scene, exposure differences, and noise. Ideally, image frames are blended where the image differences are caused only by exposure differences. In reality, however, it can be difficult to effectively differentiate image differences caused by motion, exposure differences, and noise.

As another example, cameras on mobile electronic devices typically have poor performance in low-light situations. While it is possible to increase the amount of light collected at an image sensor of a camera by increasing the exposure time, this also increases the risk of producing blurred images due to object and camera motion. As a result, a deblurring algorithm can be used to attempt to reverse the blur and recover details in the scene. Unfortunately, effectively deblurring images can be a difficult task, particularly with dynamic scenes. Among other reasons, this is because it can be difficult to localize the motion in dynamic scenes, and some deblurring algorithms can suffer from problems such as ringing. While multiple images could simply be captured and the sharpest one selected, this approach does not work well when all captured images suffer from blur or when different areas appear sharper in different images.

This disclosure provides techniques for multi-exposure fusion of multiple image frames and techniques for deblurring multiple image frames. To support the multi-exposure fusion techniques, a convolutional neural network-based approach is used to address ghosting artifacts caused by moving objects in dynamic scenes and to recover image details from over-exposed or under-exposed regions. Using these techniques, blending maps of differently exposed low dynamic range (LDR) image frames can be generated. The blending maps can then be used to blend the image frames and produce one or more final images of the scene. As a particular example, the convolutional neural network can be used to generate blending maps corresponding to different image frames, where the blending maps include information about both motion measures and well-exposedness measures of the image frames. In this way, the convolutional neural network can be used to reduce ghosting artifacts and improve image details in the final image of the scene. This approach can be useful in various applications, such as high dynamic range (HDR) imaging, image blending, or image fusion for static or dynamic scenes. The use of the convolutional neural network can also provide a more generic, robust, and interpretable approach, and it can be easily improved in various ways (such as by involving semantic information).

To support the multi-frame deblurring techniques, several approaches are combined and used to reduce the amount of blur in a scene. For example, capturing multiple image frames helps to decrease noise level since (assuming the noise is random) the noise should affect different pixels in different image frames. Also, taking a subset of input image frames with shorter exposures helps to limit the amount of blur in a final image of the scene, provided that one of the shorter-exposure image frames is used as a reference frame. In addition, a trained deblurring network can be used to reduce blur levels further, and motion-compensated noise filtering can be used to decrease noise amplification and ringing artifacts from the deblurring. In this way, the final image of the scene can include significantly less blur, even when the scene is dynamic.

Note that while the techniques described below are often described as being performed using a mobile electronic device, other electronic devices could also be used to perform or support these techniques. Thus, these techniques could be used in various types of electronic devices. Also, while the techniques described below are often described as processing image frames when capturing still images of a scene, the same or similar approaches could be used to support the capture of video images.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) using a convolutional neural network to blend image frames. The processor 120 can also or alternatively process the image data (as discussed in more detail below) to provide deblurring using multiple image frames.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101. The one or more cameras can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
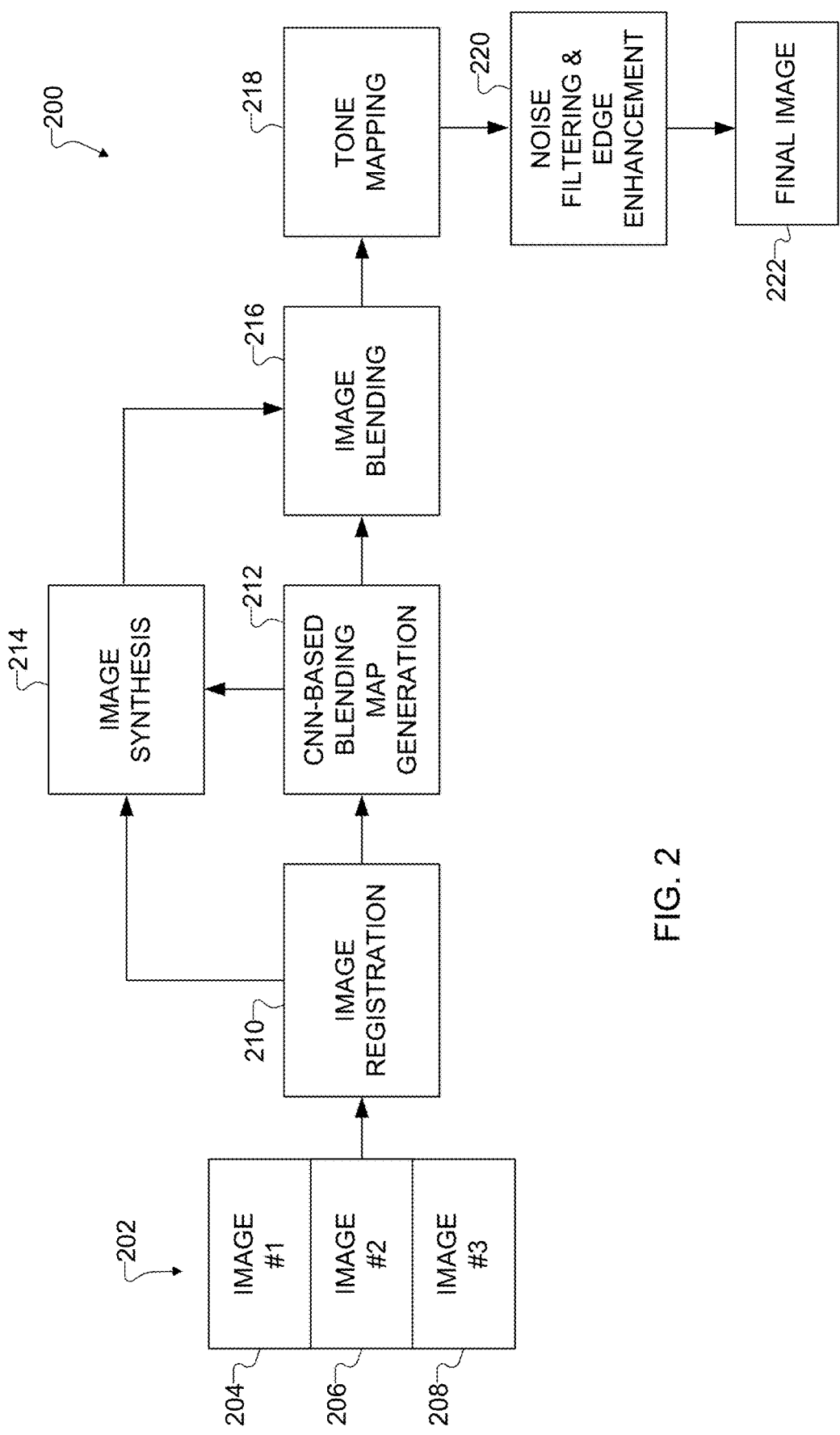
FIG. 2 illustrates an example convolutional neural network-based process for multi-exposure fusion of multiple image frames in accordance with this disclosure.

FIG. 2 illustrates an example convolutional neural network-based process 200 for multi-exposure fusion of multiple image frames in accordance with this disclosure. For ease of explanation, the process 200 shown in FIG. 2 is described as involving the use of the electronic device 101 of FIG. 1. However, the process 200 shown in FIG. 2 could be used with any other suitable electronic device and in any suitable system.

As shown in FIG. 2, a collection 202 of image frames is captured using the camera of the electronic device 101. Here, the collection 202 includes at least three image frames 204, 206, and 208. In some embodiments, each of the image frames 204, 206, and 208 can be captured using a different camera exposure. For example, the image frame 204 could be captured using the shortest exposure, the image frame 208 could be captured using the longest exposure, and the image frame 206 could be captured using an intermediate exposure between the shortest and longest exposures. Note, however, that other numbers of image frames (including two image frames or more than three image frames) could be captured and other numbers of exposures (including one or two exposures or more than three exposures) could be used. One or multiple image frames could be captured at each exposure, and there is no requirement that an equal number of image frames be captured per exposure. Also, there is nothing preventing the captured image frames from having a common exposure, rather than different exposures.

The image frame collection 202 is provided to an image registration operation 210, which generally operates to align the image frames 204, 206, and 208. Alignment may be needed if the electronic device 101 moves or rotates between image captures and causes objects in the image frames to move or rotate slightly, which is common with handheld devices. The image frames 204, 206, and 208 here can be aligned both geometrically and photometrically. The image registration operation 210 can use any suitable technique to align image frames (including those techniques described below), and various alignment techniques are known in the art.

The aligned image frames are provided to a convolutional neural network (CNN)-based blending map generation operation 212, which generally operates to produce blending maps for the aligned image frames. Each blending map can identify how and to what extent a corresponding aligned image frame is blended with other image frames. In some embodiments, the blending maps produced by the generation operation 212 are pixel-wise blending maps, meaning the blending maps identify how to blend the aligned image frames at the pixel level. Each of the blending maps can be based on or represent a composite (such as a product) of a de-ghosting map and a well-exposedness map. A de-ghosting map (also referred to as a motion map) generally identifies areas in image frames where motion is occurring and should be removed, thereby identifying the expected motion and noise level in the image frames. A well-exposedness map generally identifies the area or areas of one of the aligned image frames that are well-exposed (not over-exposed or under-exposed), which can vary based on a number of factors (such as the exposure used to capture the image frame). Thus, each blending map may contain or be based on both (i) a measure of motion in the image frames and (ii) a measure of how well-exposed different portions of the image frames are. As described below, the blending maps are used when blending the aligned image frames to reduce ghosting artifacts caused by moving objects in a scene and to recapture image details from over-exposed or under-exposed portions of the aligned image frames.

The blending map generation operation 212 can use any suitable convolutional neural network to generate the blending maps. Various architectures for convolutional neural networks are described below, and any of these architectures or other suitable architectures for convolutional neural networks can be used here. The convolutional neural network used here is generally trained to generate the blending maps based on the input image frames. For example, in image blending, differences between captured image frames (even those image frames captured rapidly, such as in a burst mode) typically come from motion of the camera capturing the image frames, motion of one or more objects in the scene, exposure differences, and noise. When image differences in portions of the image frames are caused by exposure differences or noise, those portions can be blended to help improve image details in those portions, helping to recover image details in under-exposed or over-exposed areas (even if those details have an extremely weak presence in the original inputs, such as due to saturation or occlusion).

For image differences caused by moving objects within a scene, little or no blending may be desired, since the blending would cause ghosting artifacts to appear in the final image of the scene. The convolutional neural network used here is trained to learn in which areas blending is acceptable (such as in areas where image differences are due to exposure differences) and in which areas blending should be rejected (such as in areas where image differences are due to object motion in the scene). Once trained, the convolutional neural network can generate blending maps to effectively indicate moving objects so that ghosting artifacts are significantly reduced and image details are recovered.

Compared with conventional algorithms that require manual parameter tuning (such as tuning tile sizes or motion thresholds), the blending map generation operation 212 is more generic, robust, and interpretable. Also, the blending map generation operation 212 can be trained without optical flow alignment, which is error-prone due to occlusion and large motions. The blending map generation operation 212 therefore intrinsically helps to avoid artifacts and distortions caused by erroneous optical flows. As noted above, this approach is suitable for use in various applications, such as multi-exposure fusion of dynamic or static scenes, generation of de-ghosting maps for multiple constant-exposure image frames, or other operations through appropriate training of the convolutional neural network.

The aligned image frames are also provided to an image synthesis operation 214, which also receives the de-ghosting or blending maps from the blending map generation operation 212. The image synthesis operation 214 generally operates to select a reference image frame from the aligned image frames and to replace portions of non-reference image frames containing motion with corresponding portions from the reference image frame or to combine those portions of the image frames. For example, if an object is moving within a scene when the image frames are captured, the area containing the object in the non-reference image frames can be replaced by or combined with the same area containing the object in the reference image frame. This helps to ensure that the object does not appear in multiple locations when the blending occurs, which would lead to ghosting. In some embodiments, the portions of the image frames associated with motion (which are identified in the associated de-ghosting or blending map) can undergo an alpha-blending operation, or other types of blending or outright replacement could also occur. In order to preserve the exposure differences between the image frames, the portion or portions of the reference image frame being inserted into or combined with the non-reference image frames can be modified. For instance, a histogram match can be applied on the reference frame to match its brightness to each non-reference frame. Ideally, the output of the image synthesis operation 214 includes a group of image frames (including one or more synthesized image frames) in which motion areas are consistent among all of the image frames.

The blending maps output from the blending map generation operation 212 and the image frames output from the image synthesis operation 214 are provided to an image blending operation 216. The image blending operation 216 generally operates to blend the image frames output from the image synthesis operation 214 based on the blending maps output from the blending map generation operation 212. For example, each blending map can include scalar values, each identifying a weight to be applied to a corresponding pixel value in an associated image frame. The image blending operation 216 can weight individual pixels in the same location of different image frames based on their blending maps and combine the weighted pixels. Repeating this over all pixels of the image frames from the image synthesis operation 214 leads to the generation of at least one blended image frame. Note, however, that there are a number of possible techniques for blending image frames, and the image blending operation 216 can support any suitable technique or techniques for combining image frames. In this way, the image blending operation 216 blends image frames having different brightness levels to achieve a higher dynamic range in the blended image frame.

Any suitable post-processing operations could then occur using the blended image frame. In this example, the blended image frame undergoes a tone mapping operation 218 and a noise-filtering and edge enhancement operation 220. The tone mapping operation 218 generally operates to apply a global tone mapping curve to the blended image frame in order to brighten darker areas and increase image contrast in the blended image frame. The noise-filtering and edge enhancement operation 220 generally operates to remove noise and improve the appearances of edges in the blended image frame. Various techniques for tone mapping, noise filtering, and edge enhancement are known in the art. The output of the process 200 shown in FIG. 2 is at least one final image 222 of the scene. The final image 222 generally represents a blend of the original image frames 204, 206, and 208 after processing. Ideally, the final image 222 has little or no ghosting artifacts and improved image details, even in areas where the original image frames 204, 206, and 208 were over-exposed or under-exposed.

Although FIG. 2 illustrates one example of a convolutional neural network-based process 200 for multi-exposure fusion of multiple image frames, various changes may be made to FIG. 2. For example, while shown as a sequence of steps, various operations shown in FIG. 2 could overlap, occur in parallel, occur in a different order, or occur any number of times.

Figure 3:
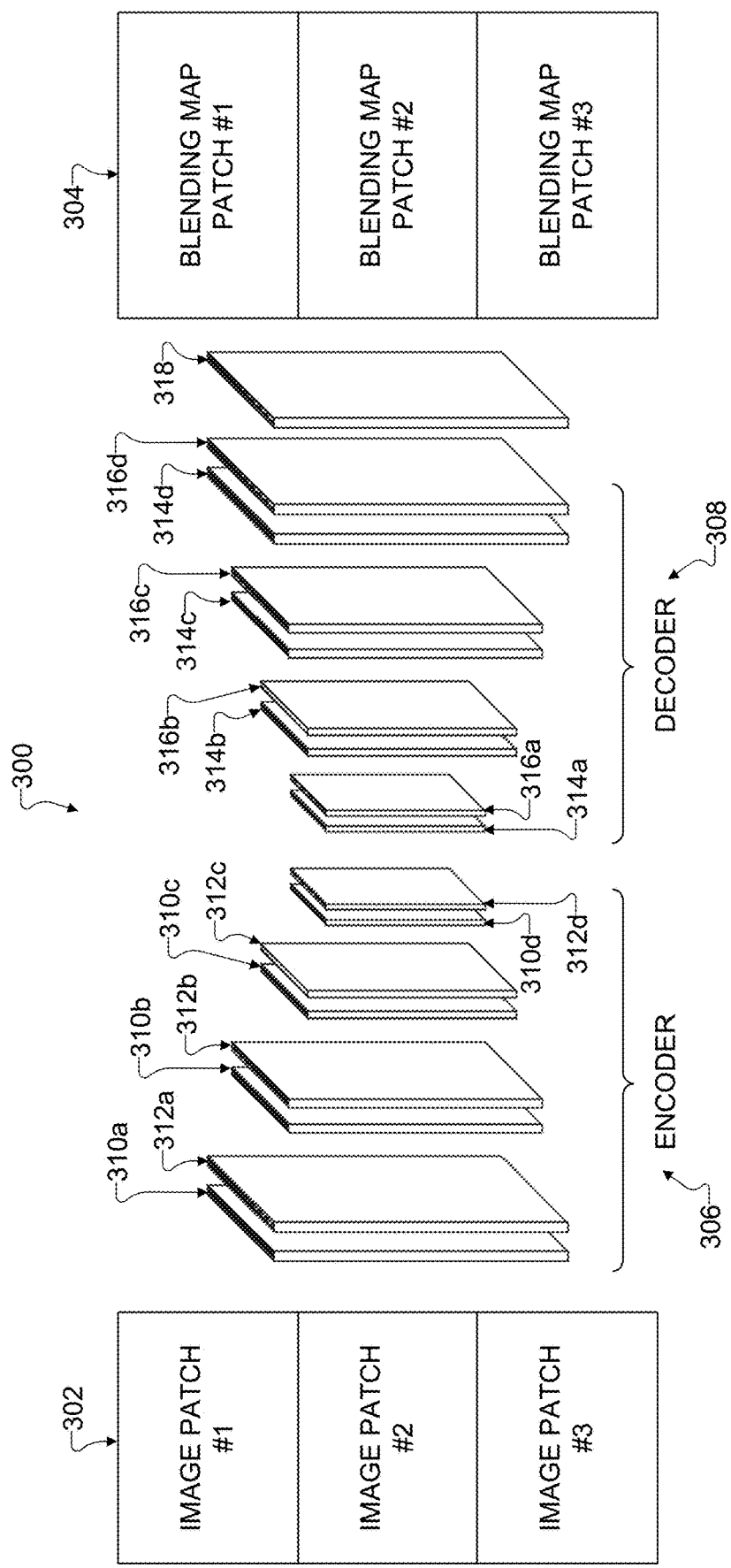
FIG. 3 illustrates an example convolutional neural network architecture in accordance with this disclosure.

FIG. 3 illustrates an example convolutional neural network architecture 300 in accordance with this disclosure. In particular, the convolutional neural network architecture 300 shown in FIG. 3 represents one possible implementation of the convolutional neural network used in the blending map generation operation 212 of the process 200 shown in FIG. 2. For ease of explanation, the convolutional neural network architecture 300 shown in FIG. 3 is described as involving the use of the electronic device 101 of FIG. 1. However, the convolutional neural network architecture 300 shown in FIG. 3 could be used with any other suitable electronic device and in any suitable system.

As shown in FIG. 3, the convolutional neural network architecture 300 generally operates to receive a collection of input image patches 302 and to produce output blending map patches 304. An image patch generally refers to a small portion of an image frame, and a blending map patch generally refers to a small portion of a blending map. Here, the input image patches 302 are assumed to have been aligned via the image registration operation 210, which allows the convolutional neural network architecture 300 to assume that differences due to camera motion have been substantially reduced or eliminated.

The convolutional neural network architecture 300 generally represents a type of deep artificial neural networks, which are often applied to analyze images. In this example, the convolutional neural network architecture 300 is formed using an encoder network 306 and a corresponding decoder network 308. The encoder network 306 is formed using multiple encoder layers, which include multiple convolutional layers 310a-310d and multiple pooling layers 312a-

312d. Each of the convolutional layers 310a-310d represents a layer of convolutional neurons, which apply a convolution operation that emulates the response of individual neurons to visual stimuli. Each neuron typically applies some function to its input values (often by weighting different input values differently) to generate output values. Each of the pooling layers 312a-312d represents a layer that combines the output values of neuron clusters from one convolutional layer into input values for the next layer. The encoder network 306 here is shown as including four encoder layers having four convolutional layers 310a-310d and four pooling layers 312a-312d, although the encoder network 306 could include different numbers of encoder layers, convolutional layers, and pooling layers.

In some embodiments, each of the convolutional layers 310a-310d can perform convolution with a filter bank (containing filters or kernels) to produce a set of features maps. These feature maps can be batch normalized, and an element-wise rectified linear unit (ReLU) function can be applied to the normalized feature map values. The ReLU function typically operates to ensure that none of its output values is negative, such as by selecting (for each normalized feature map value) the greater of that value or zero. Following that, each of the pooling layers 312a-312d can perform max-pooling with a window and a stride of two (non-overlapping window), and the resulting output is sub-sampled by a factor of two. Max-pooling can be used to achieve translation invariance over small spatial shifts in the input image patch. Sub-sampling results in a large input image context (spatial window) for each pixel in the feature maps.

The decoder network 308 is formed using multiple decoder layers, which include multiple upsampling layers 314a-314d and multiple convolutional layers 316a-316d. Each of the upsampling layers 314a-314d represents a layer that upsamples input feature maps. Each of the convolutional layers 316a-316d represents a trainable convolutional layer that produces dense feature maps, which can be batch normalized. The decoder network 308 here is shown as including four decoder layers having four upsampling layers 314a-314d and four convolutional layers 316a-316d, although the decoder network 308 could include different numbers of decoder layers, upsampling layers, and convolutional layers. Each encoder layer in the encoder network 306 could have a corresponding decoder layer in the decoder network 308, so there could be an equal number of layers in the encoder network 306 and in the decoder network 308.

A convolutional layer 318 processes the feature maps that are output by the decoder network 308. For example, the convolutional layer 318 could perform convolution operations to produce pixel-level blending map patches for the input image patches 302 independently. This allows, for instance, the convolutional layer 318 to convert the feature maps into the blending map patches 304. The blending map patches 304 are dense per-pixel representations of pixel quality measurements involving information about motion degree and well-exposedness.

In some embodiments, each input image patch 302 includes multiple color "channels," each of which typically represents one color contained in the associated image patch 302. For example, digital cameras often support red, green, and blue color channels. By concatenating the input image patches 302 along the color channels, the number of inputs to the convolutional layer 310a can be increased. For example, if there are M input image patches 302 each with N color channels, concatenating the inputs along the color channels can produce M×N inputs to the convolutional layer 310a. Similarly, the convolutional layer 316d can generate feature maps having M×N weight channels, and the convolutional layer 318 can process the feature maps to generate M blending map patches 304.

In some embodiments, the convolutional neural network architecture 300 operates as follows. The initial layers in the encoder network 306 are responsible for extracting scene contents and spatially down-sizing feature maps associated with the scene contents. This enables the effective aggregation of information over large areas of the input image patches 302. The later layers in the encoder network 306 learn to merge the feature maps. The layers of the decoder network 308 and the convolutional layer 318 simulate coarse-to-fine reconstruction of the downsized representations by gradually upsampling the feature maps and translate the feature maps into blending maps. This allows for a more reliable recovery of the details lost by the encoder network 306.

It should be noted that the convolutional neural network architecture 300 shown in FIG. 3 can be easily tailored for use in different applications. For example, sizes of the input image patches 302 can be varied and have any suitable values, such as 360 pixels by 480 pixels, 256 pixels by 256 pixels, or 200 pixels by 200 pixels. Also, the kernel sizes within the convolutional layers 310a-310d and 316a-316b can be varied and have any suitable values, such as 7×7, 5×5, or 3×3. The kernel size within the convolutional layer 318 may generally have a kernel size of 1×1, although that can also vary as needed or desired. Further, the stride used within the convolutional layers 310a-310d and 316a-316b can be varied and have any suitable values, such as one or two. Moreover, the number of layers in the encoder network 306 and in the decoder network 308 can be varied and have any suitable values, such as between four and eight layers each. Any or all of these parameters of the convolutional neural network architecture 300 can be selected to optimally fit an application's requirements on performance and computational cost.

In addition, it may be possible to compress and accelerate the operation of the convolutional neural network architecture 300 for real-time applications in various ways. For example, parameter pruning and parameter sharing can be used to remove redundancy in the parameters. As another example, low-rank factorization can be used to estimate informative parameters in learning-based models. As a third example, convolutional filters' utilization can be transferred or compacted by designing special structural convolutional filters to reduce storage and computation complexity.

Although FIG. 3 illustrates one example of a convolutional neural network architecture 300, various changes may be made to FIG. 3. For example, there are no fully-connected layers in the convolutional neural network architecture 300, so the convolutional neural network architecture 300 here is only convolutional. Other implementations of convolutional neural network architectures can be used, such as designs modeled on the Unet, SegNet, FlowNet, and FlowNet2 architectures. These architectures support various connections between encoder layers and decoders layers (such as those described below), or the architectures can be improved through the use of dropout operations, regularization terms, or data augmentation to avoid overfitting.

The training of convolutional neural networks usually requires the use of a large number of training examples. To support convolutional neural network-based multi-exposure fusion of multiple image frames, each training example could include a set of LDR image frames of a dynamic scene (or other scene) and "ground truth" blending maps associated with the image frames. A ground truth blending map generally refers to a blending map that is assumed to be valid and that can be compared to the output of the convolutional neural network to determine whether the convolutional neural network is configured properly. The goal of the training is to tune the convolutional neural network so that the convolutional neural network, when given patches of the LDR image frames, produces output blending map patches that match the ground truth blending maps. However, there are currently no existing relevant datasets suitable for this training problem since existing datasets commonly lack ground truth blending maps, are captured from static scenes, have a small number of scenes with only rigid motion, or are only end-to-end HDR imaging datasets. To overcome these problems, one or both of the following techniques could be used to generate suitable data for configuring a convolutional neural network. Note, however, that other techniques could also be used to train a convolutional neural network.

Figure 4:
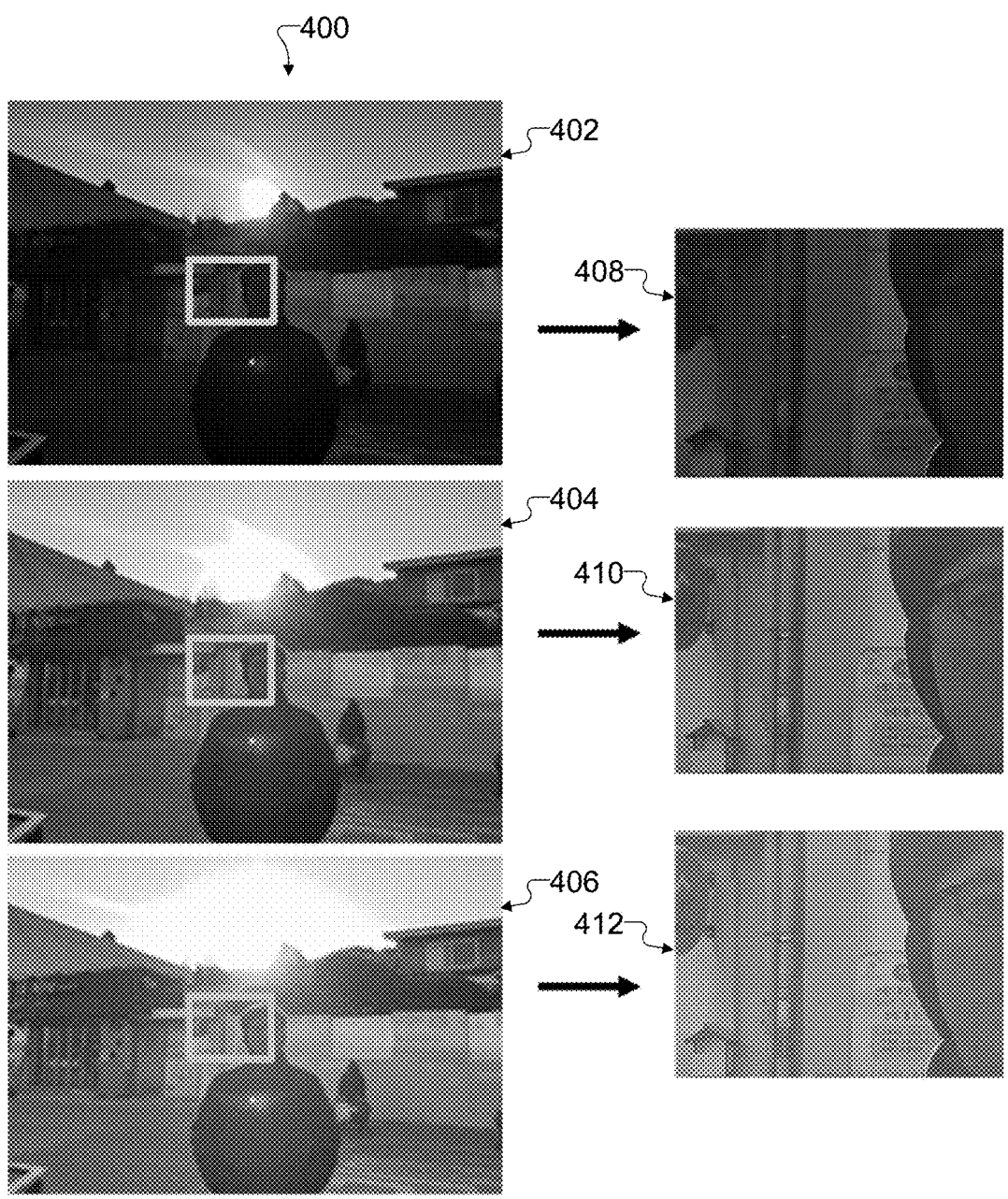
FIGS. 4 and 5 illustrate example techniques for preparing data to train a convolutional neural network in accordance with this disclosure.
Figure 5:
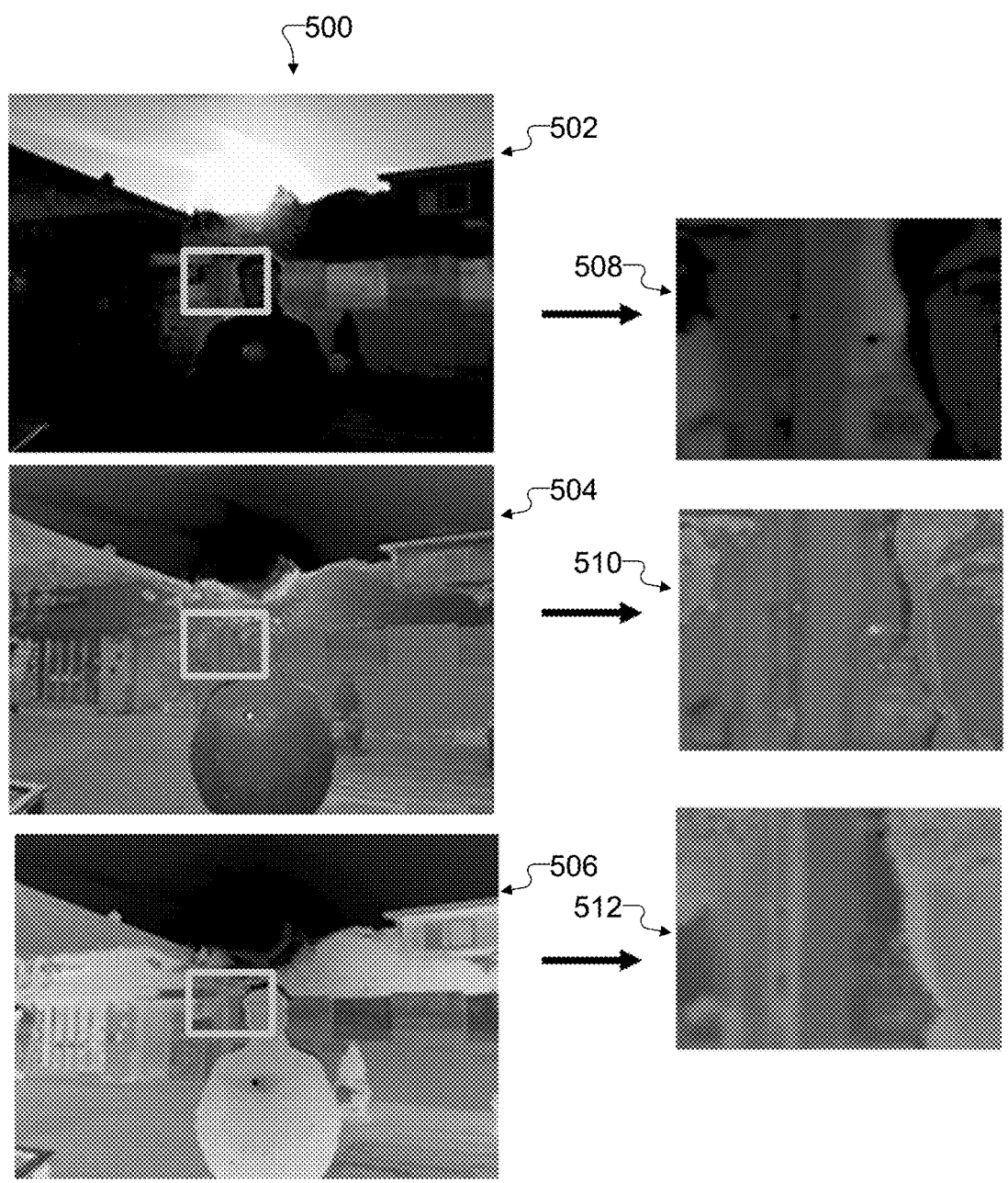

FIGS. 4 and 5 illustrate example techniques for preparing data to train a convolutional neural network in accordance with this disclosure. For ease of explanation, the techniques shown in FIGS. 4 and 5 are described as involving the use of the electronic device 101 of FIG. 1 that implements the process 200 shown in FIG. 2 using the convolutional neural network architecture 300 shown in FIG. 3. However, the techniques shown in FIGS. 4 and 5 could be used with any other suitable electronic device and in any suitable system, and the techniques shown in FIGS. 4 and 5 could be used with any other suitable processes and convolutional neural network architectures.

In order to configure such a convolutional neural network, a dataset of images would typically be obtained and used to train, validate, and test the convolutional neural network. In some embodiments, the dataset could include hundreds or thousands of image sets. Each image set would typically include multiple images of the same scene captured using different camera exposures, and different image sets would be associated with different scenes. For instance, a set of images for each scene could be captured with exposure biases of {−2.0, +0.0, +1.0}, although other camera exposures could be used. In each image set, the image with the mid-exposure value could be used as the reference image, although that need not always be the case. Also, the images of the same scene in each set would typically be pre-processed to align the images in the set so that no camera motion is present between the aligned images in that set. The images in the dataset could be divided into a training image set, a validation image set, and a testing image set. As the names imply, the training image set is used to train the convolutional neural network, such as by configuring weights or other values used in the convolutional neural network. The validation image set is used to validate the trained convolutional neural network, such as by providing the convolutional neural network with input images that were not used to train the convolutional neural network, so that operation of the convolutional neural network can be gauged over multiple training iterations. The testing image set is used to verify that the trained and validated convolutional neural network is operating properly. As a particular example of this, 260 sets of images (each set having multiple images of the same scene captured using different camera exposures) could be obtained and randomly divided such that the training set includes 139 sets of images, the validation set includes 40 sets of images, and the testing set includes 81 sets of images. Of course, other numbers of images could be used here.

In order to generate more data for use in training a convolutional neural network, the processing shown in FIG. 4 could occur. In particular, FIG. 4 illustrates one example of a set 400 of images that could be used in the training image set described above. Here, the set 400 includes three images 402, 404, and 406 of the same scene that were captured using different camera exposures. For instance, the image 402 could be captured using the shortest exposure, the image 406 could be captured using the longest exposure, and the image 404 could be captured using an intermediate exposure between the shortest and longest exposures. Because of the different camera exposures, at least one area in one or more of the images 402, 404, and 406 may be under-exposed or over-exposed. Each of the images 402, 404, and 406 could be associated with multiple color channels, such as three color channels. Note that while the set 400 here includes three images 402, 404, and 406, the set 400 could include more images, such as multiple images captured at the same exposures and/or additional images captured at different exposures.

To increase the number of training samples for the convolutional neural network, various image training patches 408, 410, and 412 can be extracted from or generated using the images 402, 404, and 406. In order to generate a suitable dataset for training, the training patches 408, 410, and 412 are extracted from or cropped in the same locations in the images 402, 404, and 406. As a result, the training patches 408, 410, and 412 can represent the same portion of a scene, but the training patches were captured using different camera exposures.

The training patches 408, 410, and 412 can have any suitable size and shape. For example, in some embodiments, the images 402, 404, and 406 could represent full resolution images, such as images captured at a resolution of about 3,000 pixels by about 4,000 pixels with three color channels (although other images could be used here). The training patches 408, 410, and 412 could represent significantly smaller areas of the images, such as areas of 360 pixels by 480 pixels (although other patch sizes could be used here). Note that while single training patches 408, 410, and 412 are shown as being generated from the images 402, 404, and 406, respectively, multiple training patches could also be obtained from each image in the set 400. In some embodiments, for instance, ten image training patches can be generated from each of the images in the set 400. If the training set includes 139 sets of images as described above, this allows 1,390 sets of training patches to be generated. Also note that one general desire here may be to focus the trained convolutional neural network more on challenging regions of images, such as regions containing motion and/or under-exposed or over-exposed regions. To do this, the locations of the image training patches can be selected so that the patches in non-reference images (such as the images 402 and 406) cover areas having more than a specified percentage of under-exposure or over-exposure or a high degree of motion compared to the same locations in the reference image (such as the image 404).

In order to generate more data for use in training a convolutional neural network, the processing shown in FIG. 5 could also occur. In particular, FIG. 5 illustrates one example of a set 500 of initial ground truth blending maps 502, 504, and 506 that are associated with the images 402, 404, and 406 in FIG. 4. The ground truth blending maps 502, 504, and 506 can be generated for the images 402, 404, and 406 in any suitable manner. For example, any suitable technique for generating blending maps known in the art can be used here. A ground truth blending map can be generated for each image in each set of the training data. However the ground truth blending maps 502, 504, and 506 are obtained, ground truth training patches 508, 510, and 512 can be extracted from or generated using the ground truth blending maps 502, 504, and 506.

Since the ground truth blending maps 502, 504, and 506 and the images 402, 404, and 406 are aligned, the image training patches 408, 410, and 412 and the ground truth training patches 508, 510, and 512 are generated using the same portions of the images 402, 404, and 406 and the ground truth blending maps 502, 504, and 506, respectively. As a result, the same number of image training patches and ground truth training patches can be generated, and the patches can have the same size and shape. Again, note that while single ground truth training patches 508, 510, and 512 are shown as being generated from the ground truth blending maps 502, 504, and 506, respectively, multiple ground truth training patches could also be obtained from each ground truth blending map in the set 500. In some embodiments, for example, ten ground truth training patches can be generated from each of the ground truth blending maps in the set 500. If the training set includes 139 sets of images as described above, this allows 1,390 sets of ground truth training patches to be generated.

Figure 6:
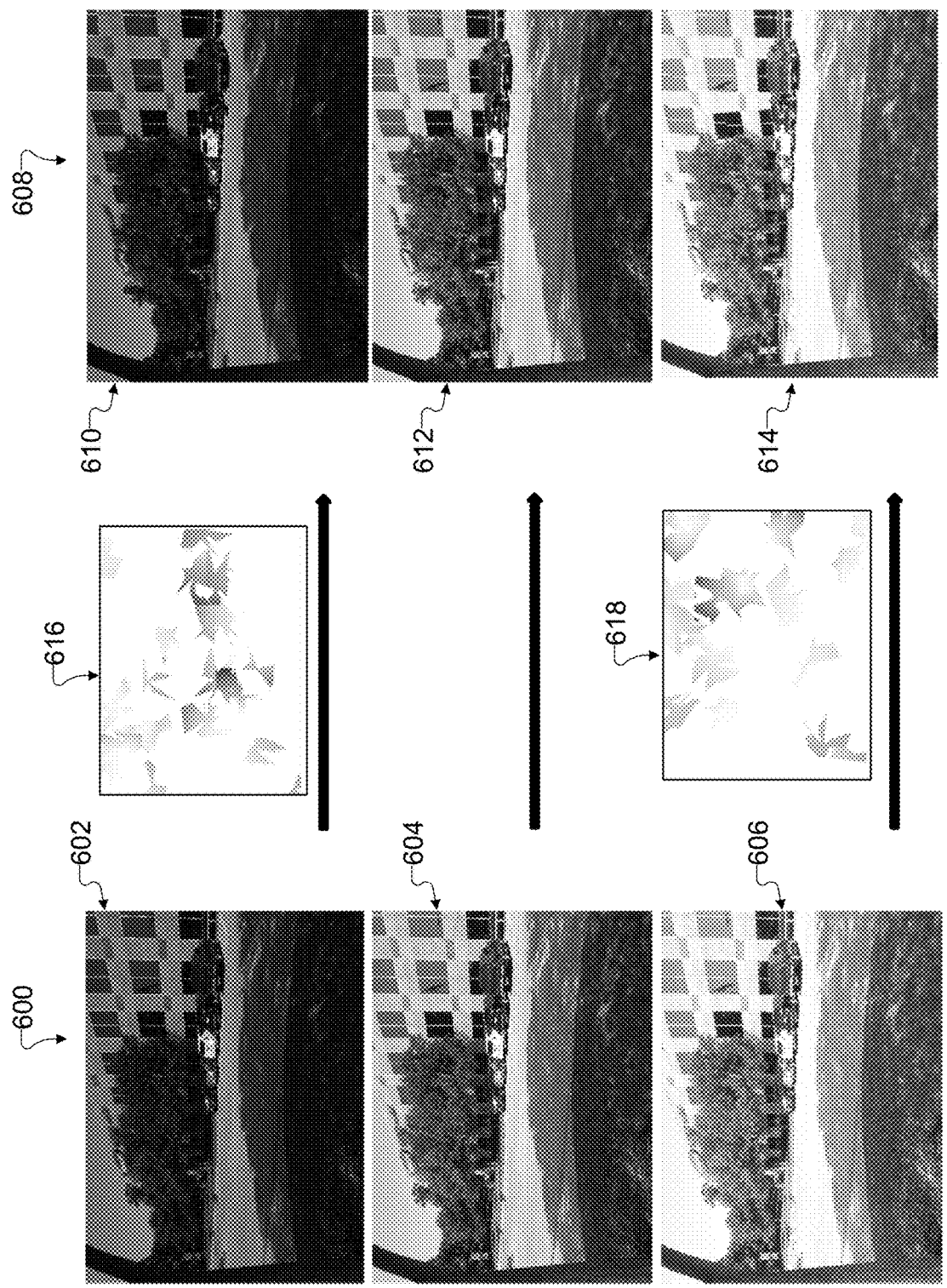
FIGS. 6 and 7 illustrate example techniques for generating synthetic data to train a convolutional neural network in accordance with this disclosure.
Figure 7:
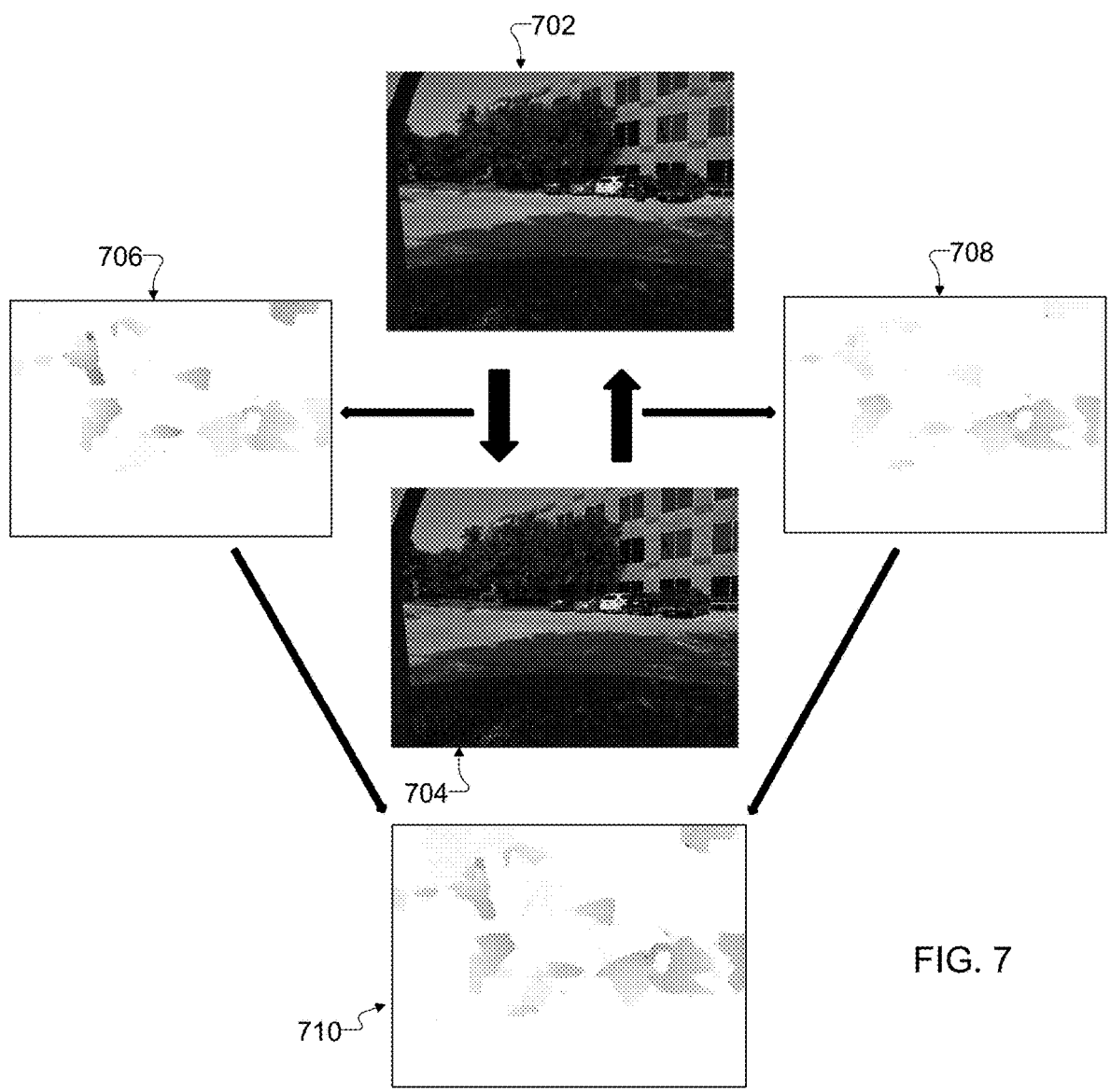

At this point, depending on the number of images in the training set and the number of patches extracted from each image in the training set, there may be enough data to train the convolutional neural network as described below. If not, synthesized images can also be used to supplement the training data in order to more effectively train the convolutional neural network. FIGS. 6 and 7 illustrate example techniques for generating synthetic data to train a convolutional neural network in accordance with this disclosure. These techniques can be used to generate synthesized image training patches and synthesized ground truth training patches, which could then be used to help train the convolutional neural network.

As shown in FIG. 6, a set 600 of images is obtained. In this example, there are three images 602, 604, and 606 in the set 600, although the set 600 could include other numbers of images. The images 602, 604, and 606 are of the same scene and are captured using different camera exposures. For example, the images 602, 604, and 606 could be captured with exposure biases of {−2.0, +0.0, +1.0}, respectively, although other camera exposures could be used. In this example, the scene is substantially or completely static, meaning there is very little or no movement in the scene. These images 602, 604, and 606 are processed to generate a set 608 of synthesized images 610, 612, and 614. In order to generate the synthesized image set 608, a warping operator 616 is applied to the image 602, and a warping operator 618 is applied to the image 606. Each warping operator 616 and 618 generally represents motion objects with random shapes and motion vectors. Applying the warping operator 616 to the image 602 creates the appearance of motion when comparing the images 602 and 610, and applying the warping operator 618 to the image 606 creates the appearance of motion when comparing the images 606 and 614. Thus, it is possible to artificially create the appearance of motion using images of a static scene, effectively converting images of the static scene into images of a dynamic scene with known motion. In this example, the image 604 is not warped using a warping operator, although it could be.

As shown in FIG. 7, once at least some of the synthesized images 608, 610, and 612 are generated, pairs of images 702 and 704 can be processed. The image 702 in each pair represents one image of a static scene (such as an image 602 or 606), and the image 704 in each pair represents the associated synthesized image of a dynamic scene (such as an image 610 or 614). If the image 604 is not warped to produce the image 612, there may be no need to process that image pair here. A forward optical flow map 706 identifying the differences due to motion from the image 702 to the image 704 can be generated, and a backward optical flow map 708 identifying the differences due to motion from the image 704 to the image 702 can be generated. Ideally, these maps 706 and 708 identify the same motion objects with the same shapes but opposite motion vectors. The maps 706 and 708 can be used to generate a ground truth blending map 710, which identifies the motion between the images 702 and 704. Again, any suitable technique for generating blending maps known in the art can be used here.

Because the images 602, 604, and 606 are taken of a static scene, the ground truth blending map 710 generated between the images 602 and 610 also (ideally) represents the same ground truth blending map 710 between the image 604 (i.e. image 612) and the image 610 since the image 612 is not warped. Stated another way, the ground truth blending map 710 generated between the images 602 and 610 is ideally the same ground truth blending map 710 that would be generated between the image 604 (i.e. image 612) and the image 610, assuming all exposure differences are ignored. Similarly, because the images 602, 604, and 606 are taken of a static scene, the ground truth blending map 710 generated between the images 606 and 614 also (ideally) represents the same ground truth blending map 710 between the image 604 (i.e. image 612) and the image 614 since the image 612 is not warped. Stated another way, the ground truth blending map 710 generated between the images 606 and 614 is ideally the same ground truth blending map 710 that would be generated between the image 604 (i.e. image 612) and the image 614, assuming all exposure differences are ignored. It is therefore possible to use the synthesized images 610, 612, and 614 and their associated ground truth blending maps to generate image training patches and ground truth training patches, such as in the same manner described above.

One or both of these approaches can also be performed for the images and ground truth blending maps of the validation set. For example, assuming the validation set includes 40 sets of images, the techniques shown in FIGS. 4 and 5 can be used to produce 400 additional sets of image training patches and associated ground truth training patches. These can be supplemented with synthetic image training patches and associated ground truth training patches that are generated using the techniques shown in FIGS. 6 and 7 if needed or desired.

For the images of the testing set, those images and their associated ground truth blending maps can be divided into image and ground truth testing patches. The individual image testing patches can be used as inputs to the convolutional neural network, and the outputs of the convolutional neural network can be compared to the ground truth testing patches during testing. The testing patches could have the same size and shape as the training and validation patches generated above, but this is not required. In some embodiments, each testing patch could have a size of 360 pixels by 480 pixels. Based on the specific resolution of the original images described above, this could allow 64 testing patches to be generated per image, although other image resolutions and numbers of testing patches could be used here. If the testing set includes 81 sets of images as described above, this could allow 5,184 sets of testing patches to be generated.

Once an adequate dataset is obtained for training, validation, and testing purposes (such as by using the generation of patches from the training image set and/or the generation of synthetic patches), the convolutional neural network is trained. In some embodiments, the convolutional neural network can be trained using a Tensorflow framework. Note, however, that other approaches for training the convolutional neural network can be used.

Although FIGS. 4 and 5 illustrate examples of techniques for preparing data to train a convolutional neural network and FIGS. 6 and 7 illustrate examples of techniques for generating synthetic data to train a convolutional neural network, various changes may be made to FIGS. 4, 5, 6, and 7. For example, any other suitable technique could be used to process or generate images and training data for a convolutional neural network.

Figure 8:
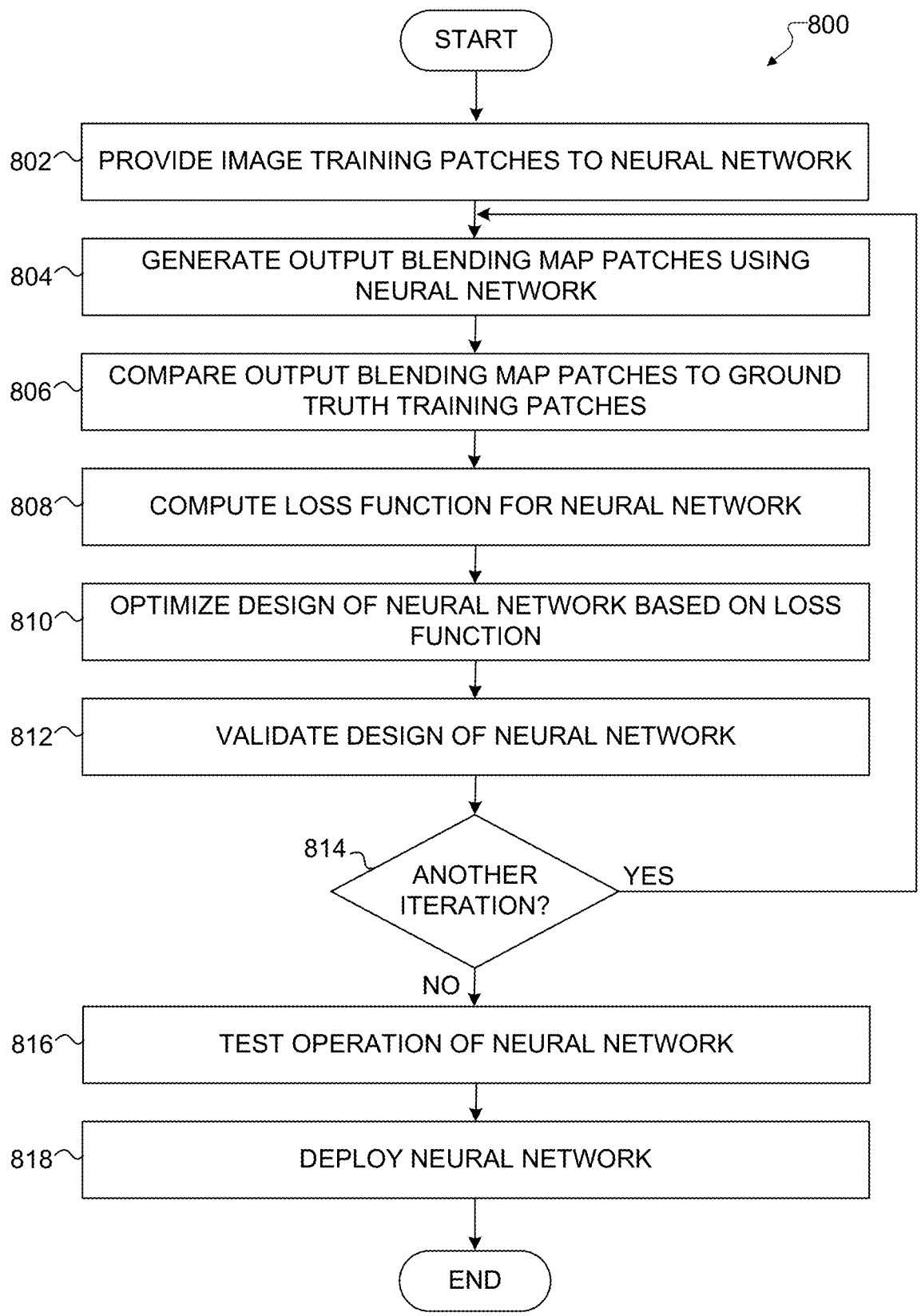
FIG. 8 illustrates an example method for training a convolutional neural network for multi-exposure fusion of multiple image frames in accordance with this disclosure.

FIG. 8 illustrates an example method 800 for training a convolutional neural network for multi-exposure fusion of multiple image frames in accordance with this disclosure. For ease of explanation, the method 800 shown in FIG. 8 is described as involving the use of the electronic device 101 of FIG. 1 using the convolutional neural network architecture 300 shown in FIG. 3. However, the method 800 shown in FIG. 8 could be used with any other suitable electronic device and in any suitable system, and the method 800 shown in FIG. 8 could be used with any other suitable convolutional neural network architectures. Also, for ease of explanation, the method 800 shown in FIG. 8 is described as using image training patches and ground truth training patches generated as described above with respect to FIGS. 4, 5, 6, and 7. However, the method 800 shown in FIG. 8 could be used with any other suitable information.

As shown in FIG. 8, image training patches are provided to a convolution neural network at step 802, and output blending map patches are generated using the convolution neural network at step 804. This could include, for example, a processor of an electronic device (such as the server 106) providing the image training patches 408, 410, and 412 to the convolution neural network, which generates output blending map patches associated with the image training patches 408, 410, and 412. The output blending map patches are compared to the ground truth training patches associated with the image training patches at step 806. This could include, for example, the processor of the electronic device comparing the output blending map patches generated by the convolution neural network to the ground truth training patches 508, 510, and 512. This could also include the processor of the electronic device identifying differences between the patches. The differences represent errors in the output of the convolutional neural network.

A loss function for the convolutional neural network is computed at step 808. This could include, for example, the processor of the electronic device computing the loss function based on the differences between the output blending map patches generated by the convolutional neural network and the ground truth training patches. Any suitable loss function can be computed here, such as a loss function of the L2 norm, L1 norm, cross entropy, or perceptual loss. Based on the computed loss, the convolutional neural network is optimized at step 810. This could include, for example, the processor of the electronic device altering the weights used in the convolutional layers 310a-310d, 316a-316d, 318 or other parameters of the convolutional neural network. The overall goal of the optimization is to try and reduce or minimize the loss function. In some embodiments, the "Adam" solver (which is derived from adaptive moment estimation) known in the art could be used to optimize the convolutional neural network's weights with a learning rate of 0.01. However, other optimization techniques and hyper-parameters (such as the learning rate) for the convolutional neural network could be used here.

The design of the neural network is validated at step 812. This could include, for example, the convolutional neural network receiving additional image training patches and additional ground truth training patches, such as those generated using the images of the validation set or those synthetically generated. The additional image training patches can be supplied to the trained convolutional neural network, and the blending map patches generated by the convolutional neural network can be compared to the additional ground truth training patches. By providing the additional image training patches to the trained convolutional neural network, this allows the operation of the trained convolutional neural network to be examined using images not provided during training, increasing the model generality of the convolutional neural network.

A determination is made whether an additional training iteration is needed at step 814. This could include, for example, the processor of the electronic device determining whether a specified number of iterations have occurred or whether a specified amount of time has elapsed. This could also include the processor of the electronic device determining whether the loss function values determined for the training or validation have converged on a generally stable and acceptable value. If another iteration occurs, the process returns to step 802, in which case the same image training patches are analyzed to determine if the loss function improves. In particular embodiments, this procedure can be performed over a large number of iterations (such as about 20,000 iterations or more) on mini-batches of image patches (such as batches of five image patches each).

Once the training iterations end, operation of the trained and validated convolutional neural network is tested at step 816. This could include, for example, the processor of the electronic device providing the testing image patches generated using the images of the testing set to the convolutional neural network. This could also include the processor of the electronic device comparing the output blending map patches from the convolutional neural network to the ground truth testing patches. Assuming the convolutional neural network functions appropriately based on the testing, the neural network can be deployed at step 818. This could include, for example, the processor of the electronic device providing data defining the weights and other parameters of the convolutional neural network to other devices, such as end-user devices.

Using this procedure, it can be shown that the training loss values obtained using the convolutional neural network generally decrease as the number of training iterations increases. Thus, it can be shown that this procedure can be used to successfully train the convolutional neural network. Also, it can be shown that the validation learning curve has a similar trend compared to the training learning curve and converges to a similar loss value, which is a good indicator that no-overfitting has occurred during the training process.

Although FIG. 8 illustrates one example of a method 800 for training a convolutional neural network for multi-exposure fusion of multiple image frames, various changes may be made to FIG. 8. For example, while shown as a series of steps, various steps in FIG. 8 could overlap, occur in parallel, occur in a different order, or occur any number of times. As a particular example, there may be no need to validate the convolution neural network in each iteration, such as when validation occurs only during some of the iterations of the training process.

Figure 9:
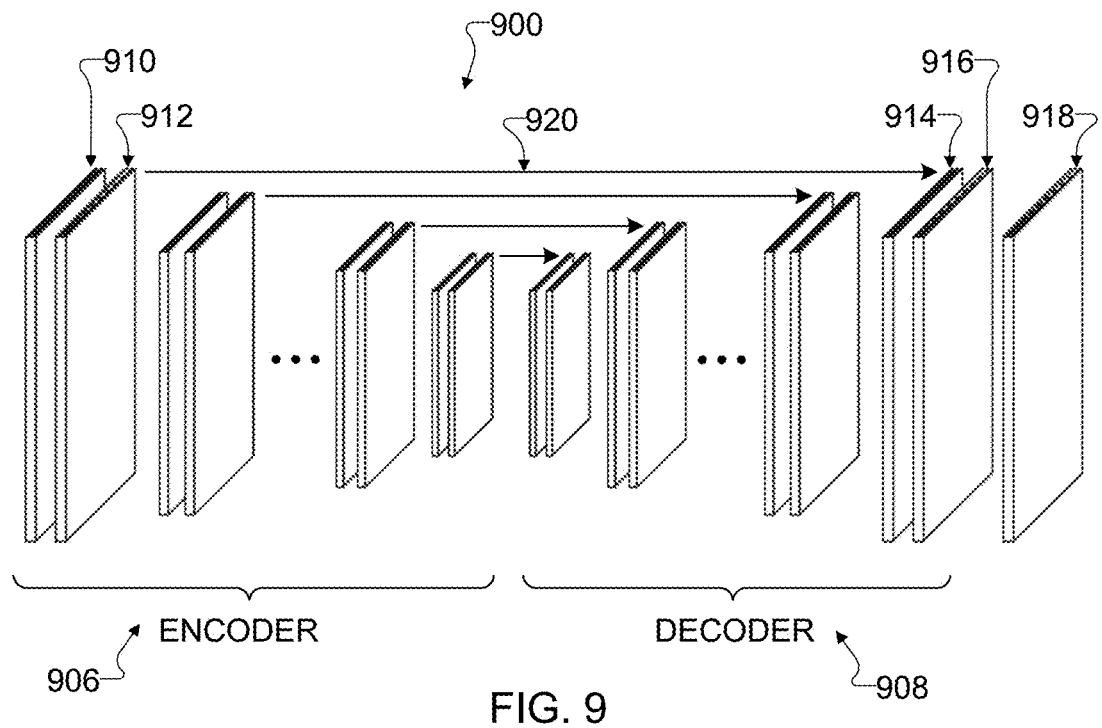
FIGS. 9, 10, and 11 illustrate other example convolutional neural network architectures in accordance with this disclosure.
Figure 10:
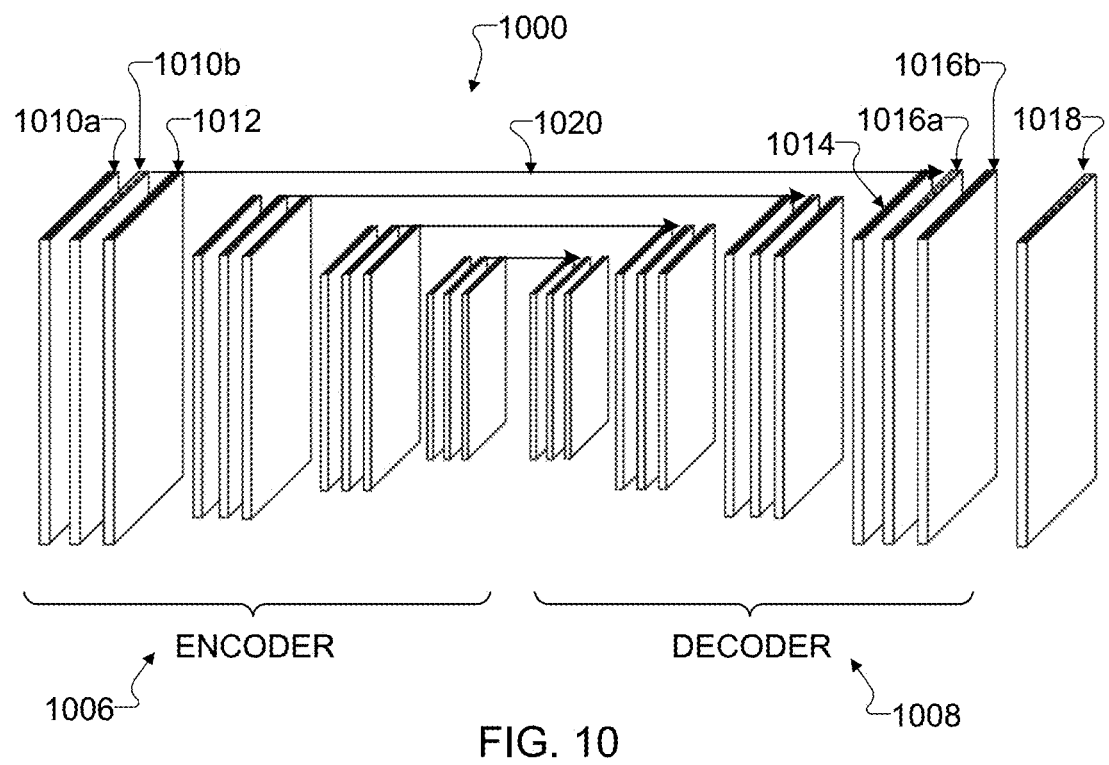
Figure 11:
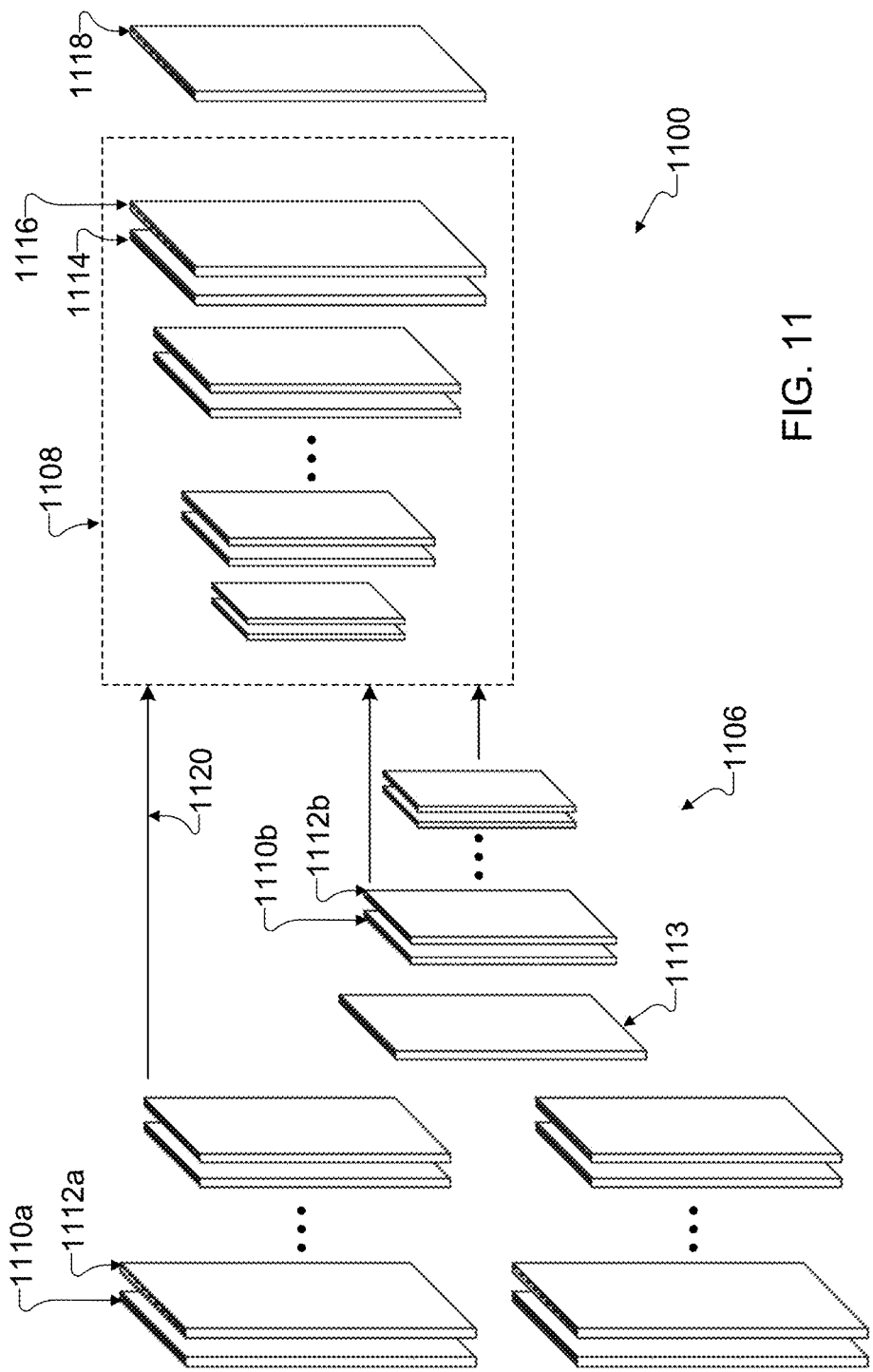

As noted above, there are various types of convolutional neural network architectures, and the architecture shown in FIG. 3 represents only one example of the type of architecture that can be used in the blending map generation operation 212 of the process 200 shown in FIG. 2. FIGS. 9, 10, and 11 illustrate other example convolutional neural network architectures in accordance with this disclosure.

As shown in FIG. 9, a convolutional neural network architecture 900 can include an encoder network 906 and a decoder network 908. The encoder network 906 includes multiple encoder layers, each of which includes a convolutional layer 910 and a pooling layer 912. The decoder network 908 includes multiple decoder layers, each of which includes an upsampling layer 914 and a convolutional layer 916. The output of the decoder network 906 is processed by a convolutional layer 918, which generates output blending map patches. Note that the encoder network 306 could include a different number of encoder layers and that the decoder network 308 could include a different number of decoder layers.

In this example, the convolutional neural network architecture 900 also includes encoder/decoder skip connections 920. Each skip connection 920 provides an output from one of the encoder layers in the encoder network 906 as an input to the corresponding decoder layer in the decoder network 908. Each skip connection 920 therefore allows an output from the associated encoder layer in the encoder network 906 to be provided to the corresponding decoder layer in the decoder network 908 as an input. The output from the associated encoder layer in the encoder network 906 can still be processed by the next layer of the encoder network 906. However, the skip connection 920 allows the output from the associated encoder layer to be presented without further processing to the corresponding decoder layer. Note that while skip connections 920 are shown here for each level of the encoder and decoder networks 906 and 908, other designs can have fewer skip connections 920.

As shown in FIG. 10, a convolutional neural network architecture 1000 can include an encoder network 1006 and a decoder network 1008. The encoder network 1006 includes multiple encoder layers, each of which includes multiple convolutional layers 1010a-1010b and a pooling layer 1012. Similarly, the decoder network 1008 includes multiple decoder layers, each of which includes an upsampling layer 1014 and multiple convolutional layers 1016a-1016b. The output of the decoder network 1008 is processed by a convolutional layer 1018, which generates output blending map patches.

In some embodiments, each pair of convolutional layers 1010a-1010b or 1016a-1016b can perform 3×3 convolution, each pooling layer 1012 can perform 2×2 max pooling, and each upsampling layer 1014 can perform 2×2 upsampling. The convolutional neural network architecture 1000 also supports one or more skip connections 1020 between corresponding encoder and decoder layers in the encoder and decoder networks 1006 and 1008. These skip connections 1020 can be used to support various functions, such as copy and crop operations. The convolutional neural network architecture 1000 shown here represents a version of the Unet architecture.

As shown in FIG. 11, a convolutional neural network architecture 1100 can include an encoder network 1106 and a decoder network 1108. The encoder network 1106 includes two levels of encoder layers, where each encoder layer in each level includes a convolutional layer 1110a and a pooling layer 1112a. The two levels of encoder layers provide outputs to a correlation layer 1113. Multiple additional encoder layers process the output of the correlation layer 1113, where each additional encoder layer includes a convolutional layer 1110b and a pooling layer 1112b. The correlation layer 1113 here can be used to perform multiplicative patch comparisons between feature maps generated by the two levels of encoder layers. The output from the correlation layer 1113 is further processed by the single level of encoding layers. The decoder network 1108 includes multiple decoder layers, each of which includes an upsampling layer 1114 and a convolutional layer 1116. The output of the decoder network 1106 is processed by a convolutional layer 1118, which generates the output blending map patches.

In some embodiments, each pooling layer 1112 can perform 2×2 max pooling, and each upsampling layer 1114 can perform 2×2 upsampling. The convolutional neural network architecture 1100 also supports one or more skip connections 1120 between corresponding layers in the encoder and decoder networks 1106 and 1108. These skip connections 1120 can be used to support various functions, such as concatenation operations. The convolutional neural network architecture 1100 shown here represents a version of the FlowNet architecture.

Any of the architectures 900, 1000, and 1100 shown here could be used in the blending map generation operation 212 in the process 200 shown in FIG. 2. This is because any of the architectures 900, 1000, and 1100 shown here could be trained in the same or similar manner described above to teach a convolutional neural network how to generate blending map patches based on input image patches.

Although FIGS. 9, 10, and 11 illustrate other examples of convolutional neural network architectures, various changes may be made to FIGS. 9, 10, and 11. For example, any of these architectures or any other architecture (now known or later developed) can be used for the convolutional neural network in the blending map generation operation 212 of the process 200 shown in FIG. 2.

It should be noted that while various operations are described above as being performed using one or more electronic devices, those operations can be implemented in any suitable manner. For example, in some embodiments, various operations can be implemented or supported using one or more software applications or other software instructions that are executed by the processor 120 of the electronic device 101. In other embodiments, at least some of the operations can be implemented or supported using dedicated hardware components. In general, the operations of an electronic device can be performed using any suitable hardware or any suitable combination of hardware and software/firmware instructions.

It should also be noted that various operations are described above as being performed using a specific implementation of the electronic device 101, but a number of modifications can be made based on the actual electronic device 101 being used. For example, the electronic device 101 could include or use a single camera or multiple cameras. If a single camera is used, multiple image frames of a scene could be captured sequentially, such as in one or more fast bursts. If multiple cameras are used, it may be possible to capture multiple image frames concurrently or in an overlapping manner. If needed, multiple image frames of the scene could still be captured sequentially using at least one of the multiple cameras. Assuming the geometry of the multiple cameras is known ahead of time, this geometry can be used to help align the image frames captured by the cameras or perform other functions. As another example, the techniques described in this patent document could be combined with conventional high dynamic range (HDR) image processing algorithms, such as in a software library used by the electronic device 101. This may allow a user of the electronic device 101 to select between different image processing algorithms or other algorithms, such as based on the specific situation or based on user preference. As a third example, while often described as being used to process images captured at different exposures, the approaches described here can be used to perform other functions, such as image fusion or blending of multiple constant-exposure images or the generation of de-ghosting or well-exposedness maps. In general, a convolutional neural network can perform various types of operations here, given suitable training of the convolutional neural network. As a fourth example, the electronic device 101 can use the techniques described above to support the capture of still images or video sequences of scenes.

Figure 12:
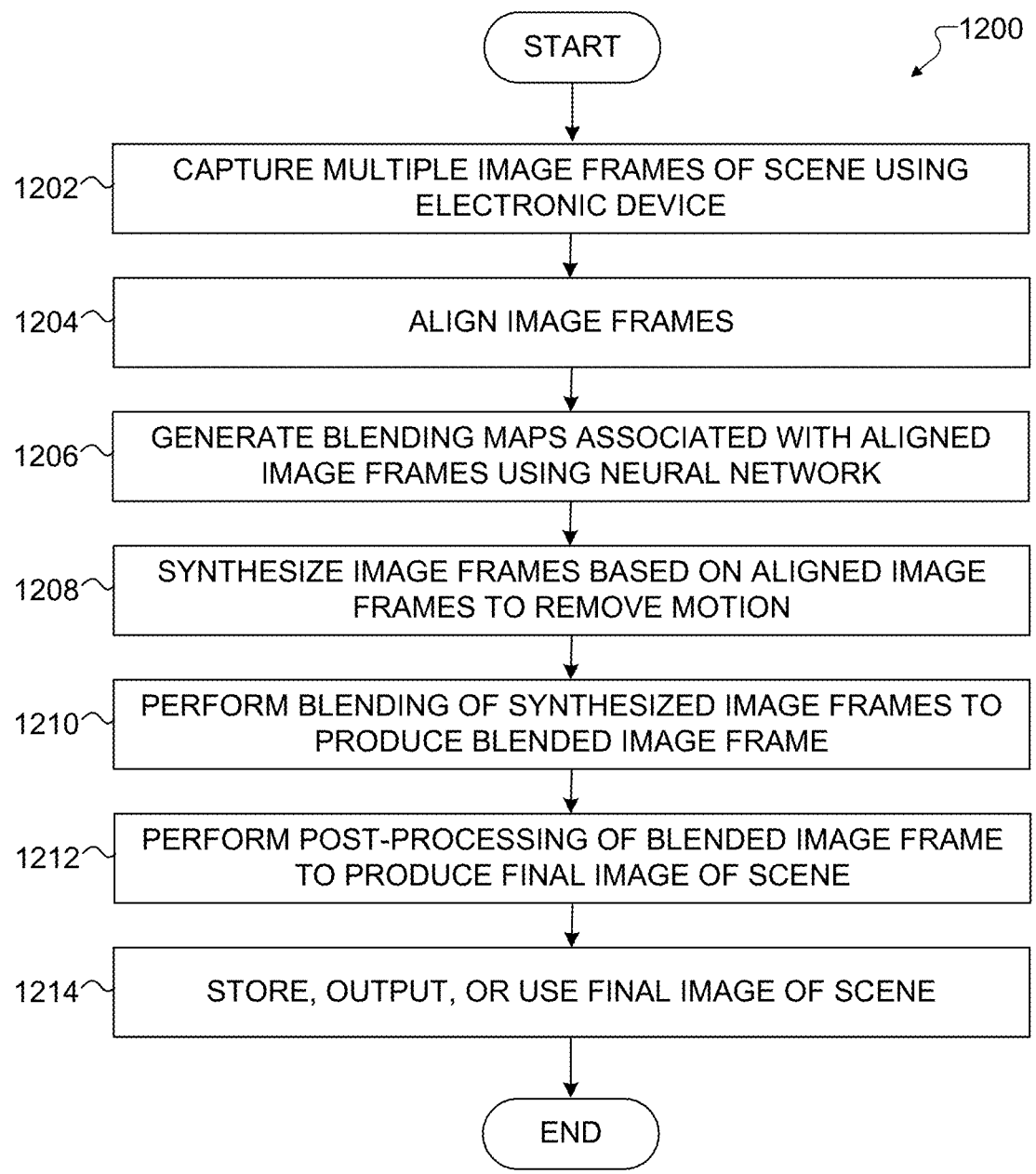
FIG. 12 illustrates an example method for using a convolutional neural network architecture for multi-exposure fusion of multiple image frames in accordance with this disclosure.

FIG. 12 illustrates an example method 1200 for using a convolutional neural network architecture for multi-exposure fusion of multiple image frames in accordance with this disclosure. For ease of explanation, the method 1200 shown in FIG. 12 is described as involving the use of the electronic device 101 of FIG. 1. However, the method 1200 shown in FIG. 12 could be used with any other suitable electronic device and in any suitable system.

As shown in FIG. 12, multiple images of a scene are captured using an electronic device at step 1202. This could include, for example, the processor 120 of the electronic device 101 receiving a capture request and causing at least one camera of the electronic device 101 to capture the image frames 204, 206, and 208 of the scene. This could also include the processor 120 of the electronic device 101 controlling the camera(s) to use different exposures when capturing the images. The images are aligned and otherwise pre-processed at step 1204. This could include, for example, the processor 120 of the electronic device 101 aligning the image frames 204, 206, and 208 by performing the image registration operation 210. Ideally, the aligned images output from the image registration operation 210 have no image differences due to camera motion, although in reality there may still be some small image differences due to camera motion (even when the image frames 204, 206, and 208 are captured in a burst mode).

Blending maps associated with the aligned images are generated using a convolutional neural network at step 1206. This could include, for example, the processor 120 of the electronic device 101 performing the blending map generation operation 212 to feed the aligned images 302 through one of the convolutional neural network architectures described above. This could also include the convolutional neural network performing convolution, inferencing, and other operations to generate the blending maps for the aligned images 302. In some embodiments, the aligned images 302 could be divided into patches (such as 320 pixel by 480 pixel patches) for each color channel of the images 302, and the patches could be input into the convolutional neural network. The outputs of the convolutional neural network would then represent blending map patches, which could be combined as needed to produce the final blending maps for the aligned images. Note that if the patches of the blending maps are simply concatenated together to form the final blending maps, the final blending maps may typically have grid pattern artifacts showing where the blending map patches were concatenated. To overcome this, the images 302 could be divided into overlapping patches, and the resulting blending map patches could be cropped and concatenated or otherwise combined to produce seamless final blending maps.

Image frames are synthesized based on the aligned image frames to remove motion from the aligned image frames at step 1208. This could include, for example, the processor 120 of the electronic device 101 performing the image synthesis operation 214 to select a reference image frame and replace areas in non-reference image frames with corresponding areas in the reference image frame. This could also include the processor 120 of the electronic device 101 performing the image synthesis operation 214 to match the exposure of the reference image frame to the exposure of each non-reference image frame in order to maintain the exposure level in each synthesized image frame.

Blending of the synthesized images is performed at step 1210. This could include, for example, the processor 120 of the electronic device 101 performing the image blending operation 216 to combine the synthesized images in accordance with the blending maps generated by the convolutional neural network. Each blending map could typically have pixels corresponding to one of the synthesized images, where darker pixels indicate that less (or none) of the associated synthesized image is being blended and brighter pixels indicate that more (or all) of the associated synthesized image is being blended. In this way, the image blending operation 216 can generate a blended image based on a weighted combination of the pixels in the synthesized images.

Any desired post-processing of the blended image frame occurs at step 1212. This could include, for example, the processor 120 of the electronic device 101 performing a tone mapping operation 218 and/or a noise-filtering and edge enhancement operation 220. The output of the post-processing is a final image of the scene, which can be stored, output, or used in some manner at step 1214. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 12 illustrates one example of a method 1200 for using a convolutional neural network architecture for multi-exposure fusion of multiple image frames, various changes may be made to FIG. 12. For example, while shown as a series of steps, various steps in FIG. 12 could overlap, occur in parallel, occur in a different order, or occur any number of times.

Figure 13A:
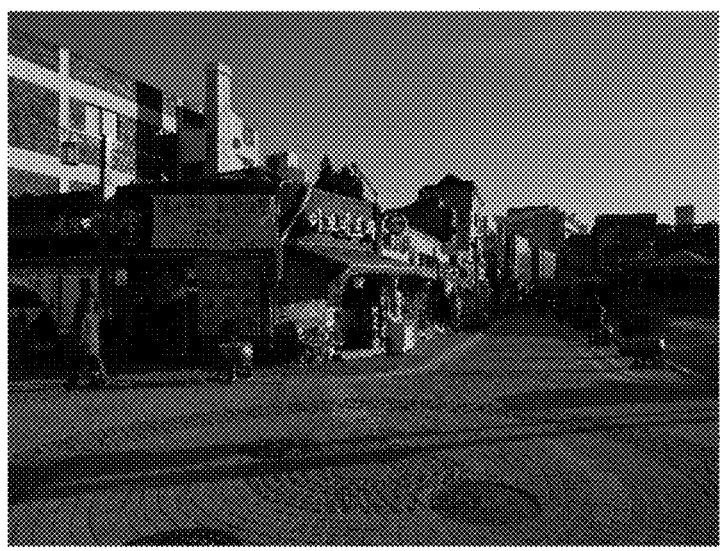
FIGS. 13A, 13B, and 13C illustrate example image frames input to a convolutional neural network architecture for multi-exposure fusion of multiple image frames in accordance with this disclosure.
Figure 13B:
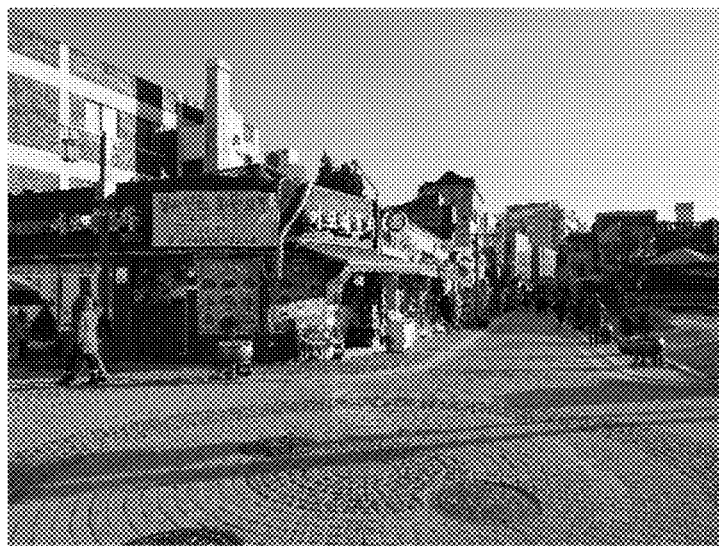
Figure 13C:
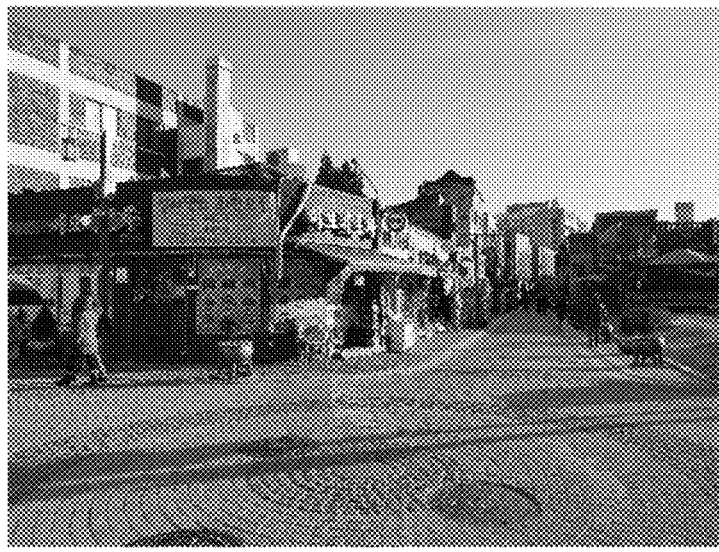

One example of the results that could be obtained using the techniques for multi-exposure fusion of multiple image frames based on a convolutional neural network is now described. FIGS. 13A, 13B, and 13C illustrate example image frames 1302, 1304, and 1306 input to a convolutional neural network architecture for multi-exposure fusion of multiple image frames in accordance with this disclosure. As can be seen here, the scene includes people and objects moving, and the image frames are captured using different exposures (with the image frame 1302 having the shortest exposure and the image frame 1306 having the longest exposure). The image frames 1302, 1304, and 1306 can be divided into image patches, which are provided to the trained convolutional neural network.

Figure 14A:
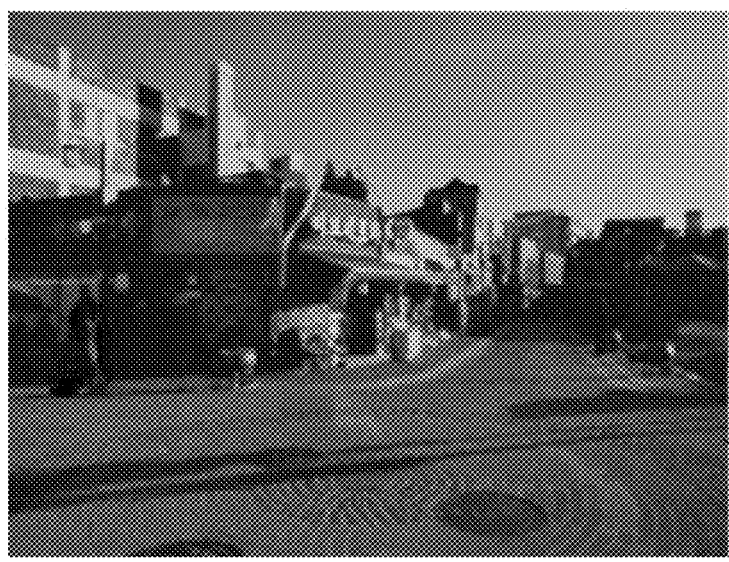
FIGS. 14A, 14B, and 14C illustrate example blending maps associated with the image frames of FIGS. 13A, 13B, and 13C in accordance with this disclosure.
Figure 14B:
Figure 14C:

FIGS. 14A, 14B, and 14C illustrate example blending maps 1402, 1404, and 1406 associated with the image frames of FIGS. 13A, 13B, and 13C in accordance with this disclosure. These blending maps 1402, 1404, and 1406 are generated by the trained convolutional neural network. For example, the convolutional neural network can process the image patches representing the image frames 1302, 1304, and 1306 and generate corresponding blending map patches. The blending map patches can then be combined to produce the blending maps 1402, 1404, and 1406. As noted above, in some cases, the blending maps 1402, 1404, and 1406 can be generated by feeding overlapping patches of the image frames 1302, 1304, and 1306 into the convolutional neural network to produce overlapping patches of the blending maps. The patches of the blending maps can then be cropped and concatenated or otherwise combined to produce the final blending maps 1402, 1404, and 1406.

Figure 15:
FIG. 15 illustrates an example output image generated using the image frames of FIGS. 13A, 13B, and 13C and the blending maps of FIGS. 14A, 14B, and 14C in accordance with this disclosure.

FIG. 15 illustrates an example output image 1500 generated using the image frames of FIGS. 13A, 13B, and 13C and the blending maps of FIGS. 14A, 14B, and 14C in accordance with this disclosure. Based on the process described above, the blending maps 1402, 1404, and 1406 can be used to blend synthesized images based on the image frames 1302, 1304, and 1306 to produce the final output image 1500. In this example, the process described above can be used to predict where motion is occurring and to reduce or prevent the formation of ghosting artifacts, while at the same time helping to recover image details from over-exposed or under-exposed areas of the original images.

Although FIGS. 13A, 13B, 13C, 14A, 14B, 14C, and 15 illustrate examples of results that can be obtained through use of a convolutional neural network-based multi-exposure fusion of multiple image frames, various changes may be made to these figures. For example, these figures are merely meant to illustrate one example of the type of results that could be obtained using the approaches described in this disclosure. Obviously, images of scenes can vary widely, and the results obtained using the approaches described in this patent document can also vary widely depending on the circumstances.

It should be noted here that the convolutional neural networks described above are routinely described as receiving input image patches and generating output blending map patches. However, that does not always need to be the case. In other embodiments, for example, the convolutional neural networks could receive entire input image frames and/or generate entire output blending maps. Here, the convolutional neural networks could be trained to divide the input image frames into patches and/or to combine the blending map patches into output blending maps. In still other embodiments, the convolutional neural networks could be trained to process input image frames and generate output blending maps without the use of patches.

Figure 16:
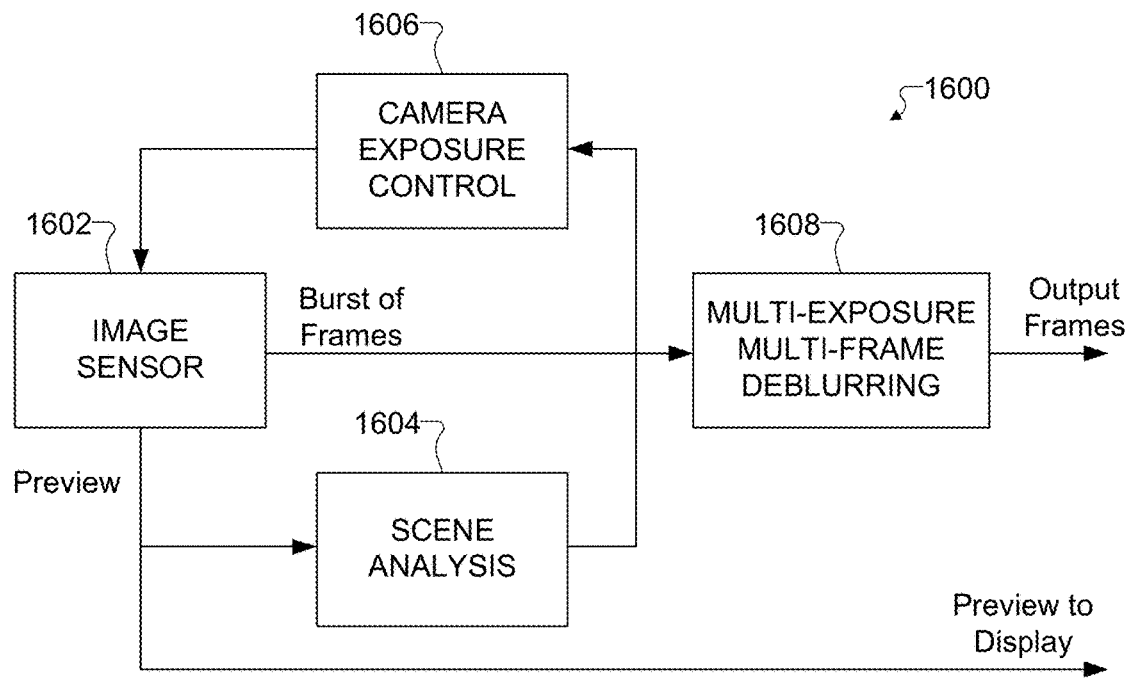
FIG. 16 illustrates an example process for deblurring multiple image frames in accordance with this disclosure.

FIG. 16 illustrates an example process 1600 for deblurring multiple image frames in accordance with this disclosure. For ease of explanation, the process 1600 shown in FIG. 16 is described as involving the use of the electronic device 101 of FIG. 1. However, the process 1600 shown in FIG. 16 could be used with any other suitable electronic device and in any suitable system.

As shown in FIG. 16, the process 1600 involves the use of at least one image sensor 1602, which could represent one or more sensors 180 in at least one camera of the electronic device 101. The image sensor 1602 can be used to capture preview image frames and bursts of image frames associated with a scene. Any suitable image sensor 1602 can be used here. The preview image frames are typically output to a display, such as the display 160 of the electronic device 101, so that a user can view the preview image frames and determine if and when to initiate capture of a burst of image frames.

The preview image frames are also provided to a scene analysis operation 1604, which generally operates to identify a baseline exposure time (denoted EV0) to be used to capture images of the scene. For example, in some embodiments, the scene analysis operation 1604 could receive the exposure time that an auto-exposure (AE) algorithm determines is appropriate for the scene based on the light level of the scene. The AE algorithm typically selects the exposure time in an attempt to balance a captured image frame in terms of brightness (meaning the captured image frame has minimal under-exposed and over-exposed pixels). The scene analysis operation 1604 could therefore operate to identify the baseline exposure time based on the light level in the image sensor's field of view just before an actual frame capture operation takes place.

The baseline exposure time determined by the scene analysis operation 1604 is provided to a camera exposure control operation 1606, which generally operates to identify the number of images frames to be captured and the exposure times to be used when capturing those image frames. For example, the camera exposure control operation 1606 could determine that the image sensor 1602 should capture one or more image frames at the baseline exposure time (EV0), one or more image frames at ½ exposure time (EV-1), one or more image frames at ¼ exposure time (EV-2), and one or more image frames at ⅛ exposure time (EV-3). Note that, depending on the total capture time budget, a single image frame or multiple image frames can be captured at each exposure, and it is possible to omit one or more of the exposure times mentioned above or add one or more additional exposure times if required or allowed by the total capture time budget. Also note that the order of image capture need not occur in order of increasing or decreasing exposure times, and the order could vary to help optimize processing time. The camera exposure control operation 1606 can control the image sensor 1602 to capture the image frames at these determined exposure levels when capturing the burst. The ISO level of the image sensor 1602 can also optionally be controlled by the camera exposure control operation 1606 during the image capture to help keep the overall gain of the captured images comparable.

The images captured by the image sensor 1602 in the burst are provided to a multi-exposure multi-frame deblurring operation 1608, which generally processes the captured images to produce at least one final image of the scene with minimal or no blurring. As described in more detail below, the deblurring operation 1608 generally operates to identify motion regions in the input image frames, where those motion regions represent areas prone to blurring due to motion. Motion regions are prone to blurring especially under low light because the exposure time increases as the light level decreases. The deblurring operation 1608 can operate to compare a reference image frame to each non-reference image frame and generate a motion map that identifies where it is safe to blend the image frames, where it is not safe to blend the image frames, and where partial blending of the image frames is possible. Essentially, each motion map identifies pixels that are more likely to belong to an object in motion. This information is used as described below to limit the locations where a deblurring algorithm is applied. One example implementation of the deblurring operation 1608 is described below, although other implementations of the deblurring operation 1608 could also be used.

Figure 17:
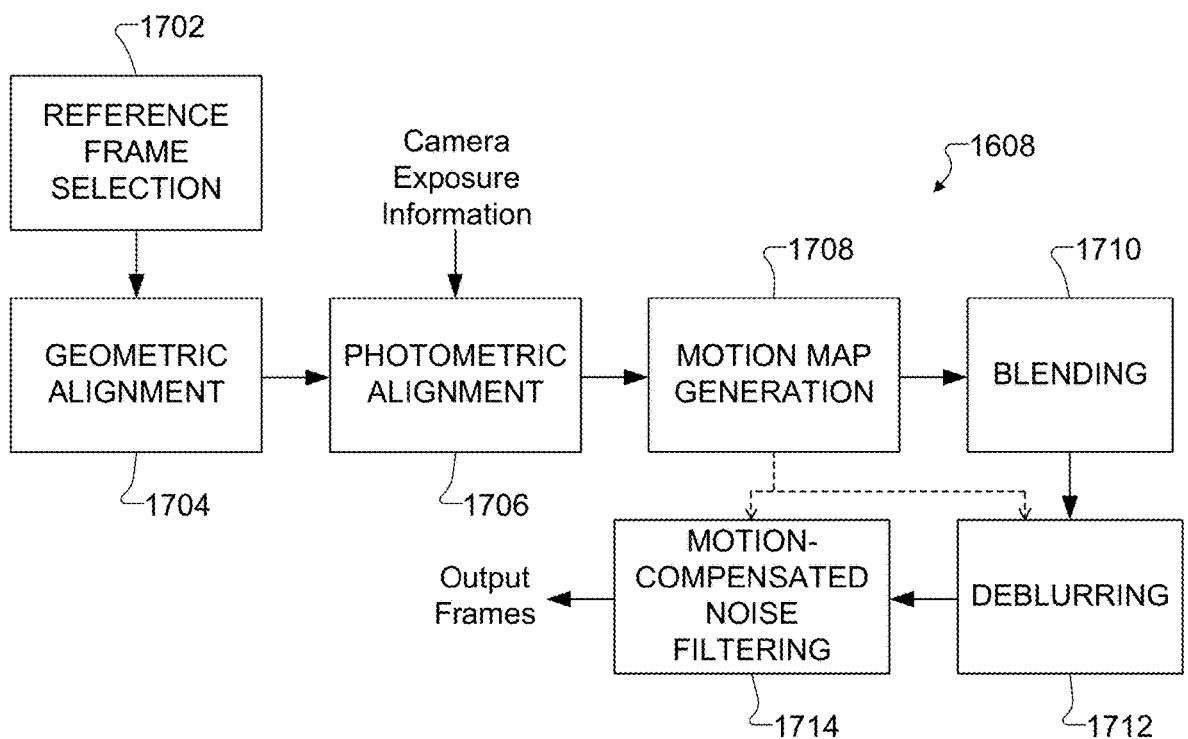
FIG. 17 illustrates an example process for performing a multi-exposure multi-frame deblurring operation in the process of FIG. 16 in accordance with this disclosure.

FIG. 17 illustrates an example process for performing a multi-exposure multi-frame deblurring operation 1608 in the process 1600 of FIG. 16 in accordance with this disclosure. As shown in FIG. 17, the deblurring operation 1608 includes a reference frame selection operation 1702, which generally operates to select one of the input image frames as a reference frame. Any suitable criteria can be used to select the reference frame from among the input image frames. In some embodiments, the reference frame selection operation 1702 uses a sharpness metric to rank the input image frames and then selects the image frame with the highest sharpness score as the reference frame. Frames with comparatively low sharpness scores can be rejected entirely and omitted from further processing, such as to eliminate the risk of introducing their artifacts into the final output image. One example implementation of the reference frame selection operation 1702 is described below, although other implementations of the reference frame selection operation 1702 could also be used.

A geometric alignment operation 1704 generally operates to transform the non-reference image frames so that they are aligned with the selected reference image frame. Various techniques are known in the art for performing geometric alignment. In one example technique, each image frame can be divided into tiles (such as tiles in a four-by-four pattern), and Oriented FAST and Rotated BRIEF (ORB) feature points can be located in the tiles. Correspondences are then identified between these feature points, such as by identifying a feature point in a non-reference image frame that is also identified in the same tile of the reference image frame, and incorrect feature point matches are dropped. A transformation matrix identifying how to transform the non-reference image frame so that its feature points align with the corresponding feature points of the reference image frame is determined, and the transformation matrix is applied to the non-reference image frame. This can be repeated for each non-reference image frame. After this operation, all stationary objects in the scene contained in the non-reference image frames should (ideally) be in alignment with the reference image frame, and only moving objects should be at different pixel coordinates.

A photometric alignment operation 1706 generally operates to match pixel value observations from input image frames having different exposures so that their differences can be used as a measure of motion. Various techniques are known in the art for performing photometric alignment. In one example technique, global histogram matching is used for this purpose, which is robust to motion pixels as long as they are not the majority of the total number of pixels. It should be noted here that, as described above, the ISO level of the image sensor 1602 can be adjusted during the image capture to help keep the overall gain of the captured image frames comparable. The photometric alignment operation 1706 performed via histogram matching can also or alternatively be used to help keep the overall gain of the image frames comparable. Bringing the image frames (captured at different exposures) to approximately the same brightness level allows the image frames to be more easily compared in order to detect motion.

A motion map generation operation 1708 generally operates to receive the pre-processed image frames and generate motion maps identifying motion captured by the image frames. For example, the motion map generation operation 1708 can compare each non-reference image frame to the previously-selected reference image frame in order to identify locations where the two image frames differ (such as by at least some threshold amount or percentage). The output of the motion map generation operation 1708 includes motion maps, which identify areas associated with motion in the various image frames. For instance, each motion map could include black pixels indicating where no motion is detected and white pixels indicating where motion is detected. One example implementation of the motion map generation operation 1708 is described below, although other implementations of the motion map generation operation 1708 could also be used.

A blending operation 1710 receives the aligned image frames and the motion maps and uses this information to generate one or more blended image frames. Each blended image frame can include or be based on portions of different image frames. For example, a blended image frame could be formed by combining pixel values as weighted by the motion maps. Essentially, the blending allows content from the non-reference image frames to be brought into the reference image frame based on the local motion response. Partial blending is possible, which makes motion-no motion transitions more manageable. Various techniques are known in the art for blending multiple image frames.

Each blended image frame can then be subjected to one or more post-processing operations in order to improve the blended image frame. For example, the blended image frame can be subjected to a deblurring operation 1712, which generally operates to reduce the amount of blur in the blended image frame. When implemented using a convolutional neural network, for instance, the amount of blur in the blended image frame can be reduced based on the examples for which the deblurring operation 1712 has been trained. Different architectures can be employed for different use cases here. For instance, some neural networks perform batch processing of all input frames, and this type of network could be more suitable for still image applications. Sequential architectures (such as recurrent neural networks) expect one additional frame at a time and maintain temporal consistency, which could be more suitable for video applications. Any suitable neural network or other mechanism for performing deblurring can be used here. Note that because the motion maps are available to the deblurring operation 1712, the deblurring operation 1712 only needs to process the blended image frame in the area or areas where the motion maps indicate motion is occurring.

Since deblurring tends to have a noise amplification effect, the blended image frame can be processed by a motion-compensated noise filtering operation 1714. Various types of noise filtering are known in the art, and a hierarchical motion vector search or some sort of optical flow could be used to help provide noise filtering that is motion-compensated. Once again, note that because the motion maps are available to the noise filtering operation 1714, the noise filtering operation 1714 may only need to process the blended image frame in the area or areas where the motion maps indicate motion is occurring. The output of the noise filtering operation 1714 can represent a final image of a scene.

The process shown in FIG. 17 can support various features to improve the generation of a final image of a scene. For example, the use of multiple image frames captured using different exposures can help to limit the amount of blur in the final image of the scene. Moreover, noise levels can be decreased by combining the image frames where possible. Shorter exposures make de-noising harder, since it becomes harder to distinguish motion from noise as the noise level in each frame increases. Having multiple exposure levels helps with this issue because longer exposures can provide lower noise samples (even though they suffer from blurring in some regions), and the shorter-exposure frames provide sharper samples of moving objects even though their overall noise level is higher. As another example, reference frame selection among multiple image frames with the same exposure level can enable the use of the image frame with the least amount of blur. Since it might not be possible to reduce blur levels if the blur is consistent in all image frames, having some lower-exposure image frames helps to ensure the availability of image frames with less blur even in constant object motion cases. Further, the described techniques help to increase the effectiveness of the deblurring operation 1712 by limiting the blur level at its input, and multi-frame deblurring and motion-compensated noise filtering help to reduce or avoid ringing artifacts. In addition, joint control of various operations can be used to help improve overall image quality. For instance, both multi-frame deblurring and noise-filtering sensitivities can be controlled by the estimated noise level from image capture settings, and those settings themselves cam be optimized based on the scene analysis.

Figure 18:
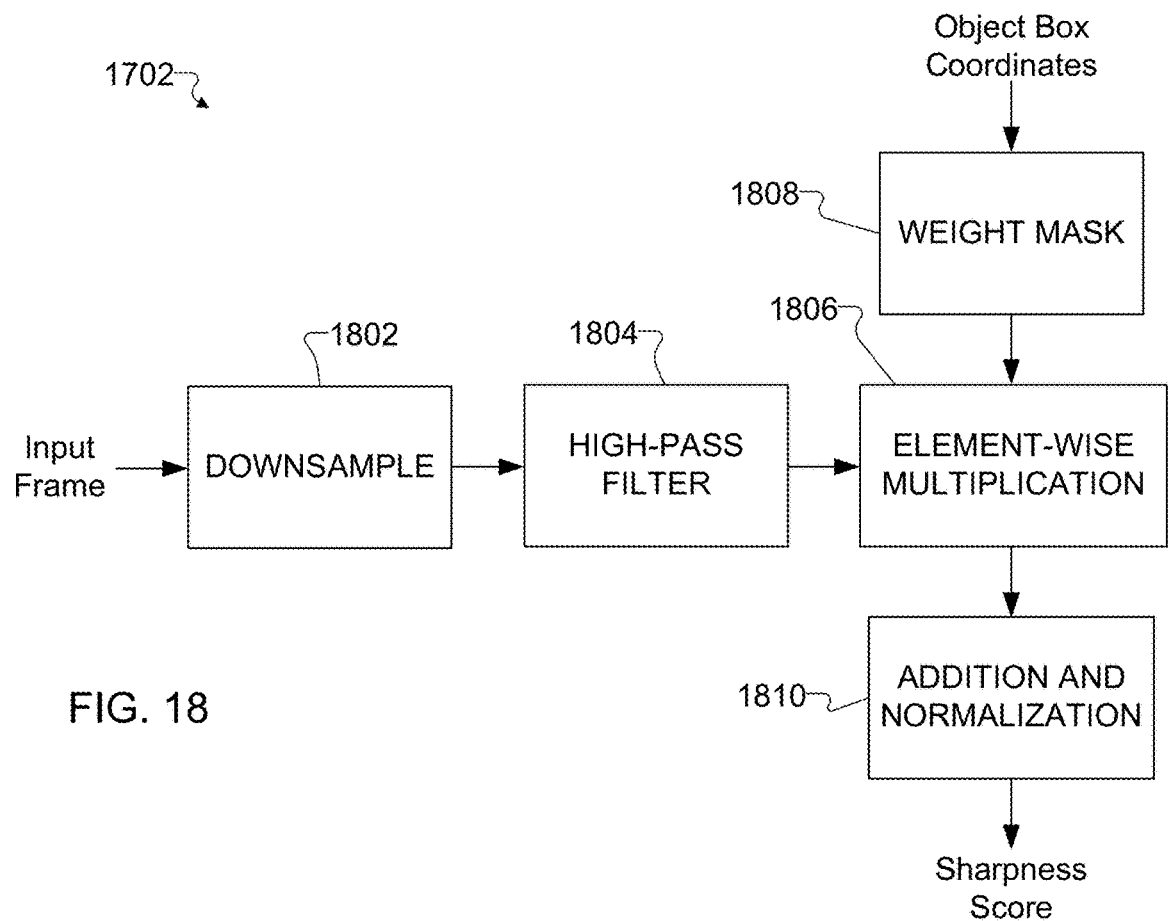
FIG. 18 illustrates an example process for performing a reference frame selection operation in the process of FIG. 17 in accordance with this disclosure.

FIG. 18 illustrates an example process for performing a reference frame selection operation 1702 in the process of FIG. 17 in accordance with this disclosure. In particular, FIG. 18 illustrates an example mechanism that can be used to calculate sharpness scores for input image frames, where the sharpness scores can be used to select a reference image frame from among a set of input image frames. As shown in FIG. 18, a downsampling function 1802 receives an input image frame and downsamples the image data to produce a downsampled image frame. The downsampling allows less image data to be processed in subsequent operations, which can help to speed up the subsequent operations. Any suitable amount of downsampling can be used, such as by downsampling the data by a factor of two. However, downsampling is not necessarily required here. The image data is passed through a high-pass filter 1804, which filters the image data. The high-pass filter 1804 represents any suitable high-pass filter for filtering image data.

An element-wise multiplication operation 1806 multiplies pixel values in the filtered image data by values in a weight mask 1808, and an addition and normalization operation 1810 sums the products of the multiplication and normalizes the resulting sum to produce a sharpness score for the input image frame. The weight mask 1808 can be based on object box coordinates for one or more moving objects in the image frame. An object box generally refers to a box computationally placed around a moving object in a scene, and pixels in the filtered image data can be reduced (possibly to zero) if they fall within an object box since motion generally results in lower sharpness in the image frame. Larger amounts of movement in a scene can result in larger areas occupied by object boxes, causing the final sharpness score to be reduced.

The process shown in FIG. 18 can be repeated for each image frame in a set of input image frames. The image frame with the highest sharpness score in the set can be selected as the reference image frame, and the other image frames in the set can be treated as non-reference image frames. It is also possible to completely discard image frames if their sharpness scores fall below some threshold value (compared to the sharpness score of the reference image frame). This can help to reject image frames where the amount of blur is too high or where their use in blending would result in blur.

Figure 19:
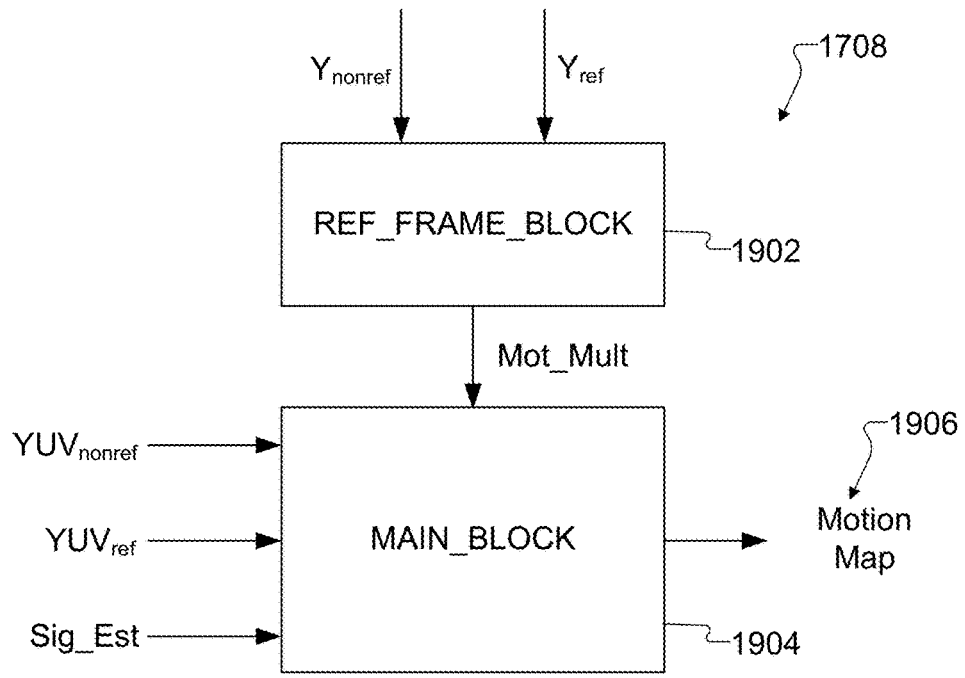

FIGS. 19, 20, 21, 22, and 23 illustrate an example process for performing a motion map generation operation 1708 in the process of FIG. 17 in accordance with this disclosure. As described above, the motion map generation operation 1708 is used to identify motion in aligned versions of images captured by the electronic device 101. As shown in FIG. 19, the motion map generation operation 1708 generally includes operations performed by a reference frame block 1902 and a main block 1904. The reference frame block 1902 receives luminance (Y) values of a reference image frame and a non-reference image frame and generates a motion multiplier (Mot_Mult) for the two image frames. The motion multiplier controls how aggressively the main block 1904 in the motion map generation operation 1708 will be in terms of rejecting pixels with high difference as motion. The main block 1904 receives the motion multiplier, the luminance values of the reference and non-reference image frames, and chrominance values (U and V) of the reference and non-reference image frames, along with any desired tuning parameters (such as a noise level estimate denoted Sig_Est). The noise level estimate can be based on the ISO level of the camera during the capture of the image frames. The main block 1904 uses this information to generate a motion map 1906 for the two image frames. The motion map 1906 identifies areas in the two image frames where motion is occurring and should be removed, thereby identifying the expected motion and noise level in the image frames.

Figure 20:
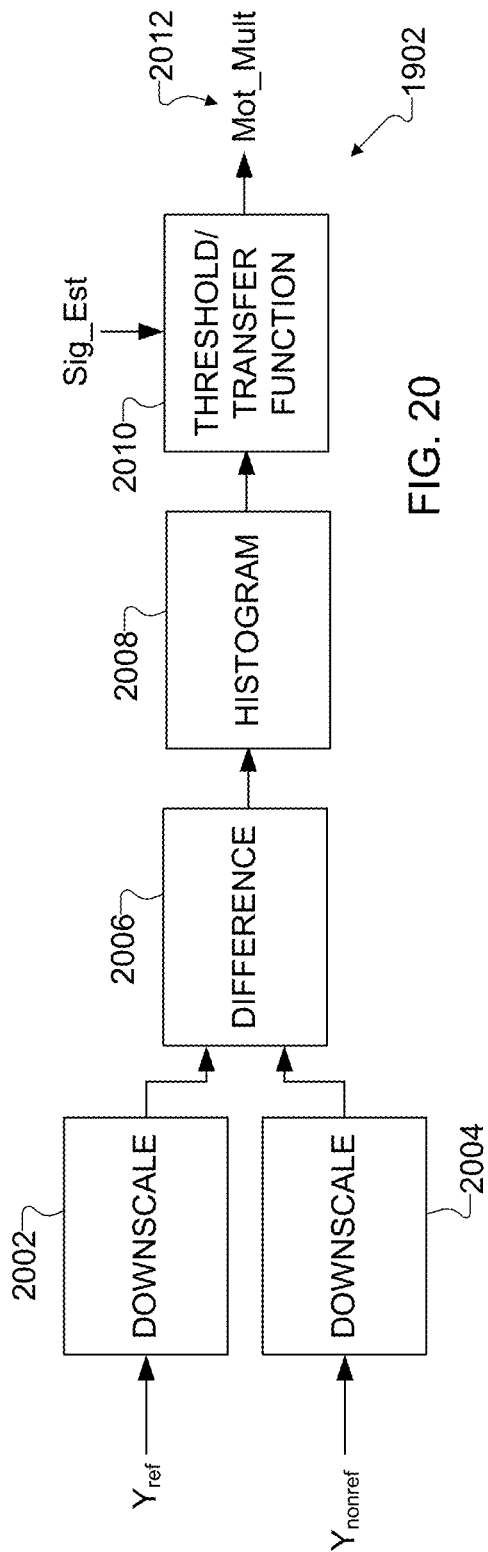

FIG. 20 illustrates an example implementation of the reference frame block 1902 in FIG. 19. As shown in FIG. 20, the reference frame block 1902 includes downscaling functions 2002 and 2004. The downscaling function 2002 receives the luminance values $Y_{ref}$ of the reference image frame and downscales the luminance values to produce downscaled luminance values $Y_{ref\_DS}$. Similarly, the downscaling function 2004 receives the luminance values $Y_{nonref}$ of the non-reference image frame and downscales the luminance values to produce downscaled luminance values $Y_{nonref\_DS}$. The downscaling allows less data to be processed in subsequent operations, which can help to speed up the subsequent operations. Any suitable amount of downscaling can be used, such as by downscaling the data by a factor of four. However, downscaling is not necessarily required here.

A difference function 2006 identifies the differences between the downscaled luminance values (or of the original luminance values) on a pixel-by-pixel basis. The difference function 2006 outputs a difference map identifying only the differences between the image frames, which (ideally) represent motion within the image frames. For example, the difference map could have darker pixels indicating little difference between the image frame pixel values and brighter pixels indicating more differences between the image frame pixel values. A histogram function 2008 generates a histogram based on the difference map, which quantifies motion statistics within a tile.

A threshold/transfer function 2010 receives the motion statistics from the histogram function 2008 and the noise level estimate Sig_Est. The threshold/transfer function 2010 uses the noise level estimate to identify when differences detected in the image frames are actually representative of motion in the image frames. The output of the threshold/transfer function 2010 is a motion multiplier 2012.

Figure 21:
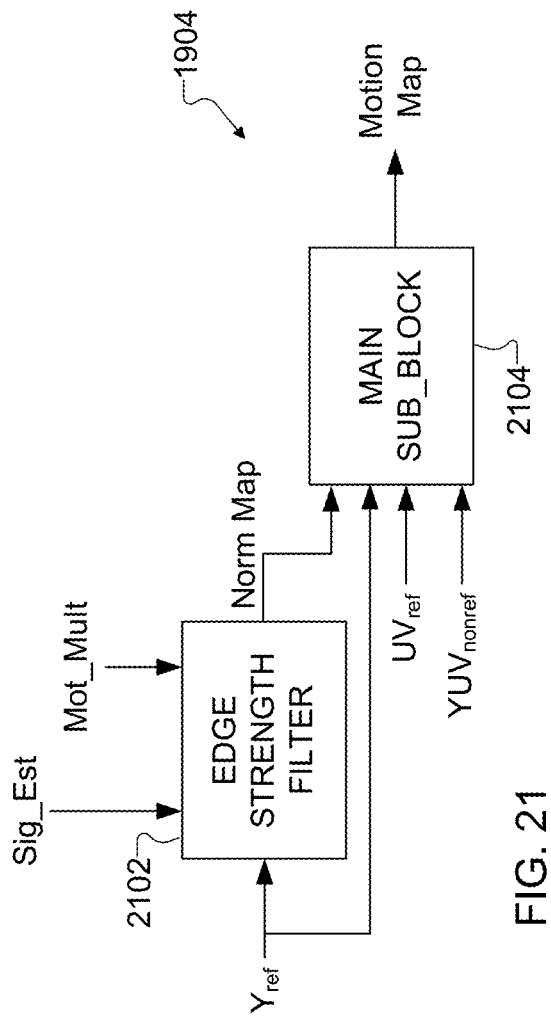

FIG. 21 illustrates an example implementation of the main block 1904 in FIG. 19. As shown in FIG. 21, the main block 1904 includes an edge strength filter 2102 and a main sub-block 2104. The edge strength filter 2102 receives the luminance values $Y_{ref}$ of the reference image frame, the noise level estimate Sig_Est, and the motion multiplier Mot_Mult and generates a norm map, which is used by the main sub-block 2104. One example implementation of the edge strength filter 2102 is described below, although other implementations of the edge strength filter 2102 could also be used. The main sub-block 2104 receives the luminance and chrominance values YUV$_{ref}$ and YUV$_{nonref}$ of the reference and non-reference image frames, along with the norm map. The main sub-block 2104 uses this information to generate the motion map 1906. One example implementation of the main sub-block 2104 is described below, although other implementations of the main sub-block 2104 could also be used.

FIG. 22 illustrates an example implementation of the edge strength filter 2102 of the main block 1904 in FIG. 21. As shown in FIG. 22, the edge strength filter 2102 includes a downscaling function 2202, which receives the luminance values Y$_{ref}$ of the reference image frame and downscales the luminance values to produce downscaled luminance values Y$_{ref\_DS}$. Any suitable downscaling can be used here (such as downscaling by a factor of four), although no downscaling may be needed. The downscaled luminance values Y$_{ref\_DS}$ are passed through a high-pass filter 2204 to produce edge values (denoted Y$_{ESF}$), which represent rough edges in the scene. The edge values are passed through a low-pass filter 2206 to produce filtered edge values (denoted Filter$_{ESF}$), which represent smoothed edges in the scene. The high-pass filter 2204 represents any suitable high-pass filter for filtering pixel values, such as a 3×3 high-pass filter. The low-pass filter 2206 represents any suitable low-pass filter for filtering pixel values, such as a 5×5 low-pass filter.

The filtered edge values are provided to an add/shift/multiply function 2208, which also receives the noise level estimate Sig_Est and the motion multiplier Mot_Mult. The add/shift/multiply function 2208 operates to generate the norm map using this information, where the norm map is used to normalize the motion due to pixel differences within a tile as described below. The add/shift/multiply function 2208 can use the filtered edge values Filter$_{ESF}$, noise level estimate Sig_Est, and motion multiplier Mot_Mult in any suitable manner to generate the norm map. In some embodiments, the add/shift/multiply function 2208 generates the norm map by performing the following calculation, although other suitable calculations could also occur.

$$((Sig\_Est+Filter_{ESF})*Mot\_Mult/4)/16 \quad (1)$$

FIG. 23 illustrates an example implementation of the main sub-block 1104 of the main block 1904 in FIG. 19. As shown in FIG. 23, the main sub-block 1104 includes difference functions 2302 and 2304. The difference function 2302 identifies the differences Y$_{diff}$ between the luminance values Y$_{ref}$ and Y$_{nonref}$ of the reference and non-reference image frames, and the difference function 2304 identifies the differences U$_{diff}$ and V$_{diff}$ between the chrominance values UV$_{ref}$ and UV$_{nonref}$ of the reference and non-reference image frames. The differences Y$_{diff}$ in the luminance values are provided to an average/downscale function 2306, which averages sets of luminance value differences to downscale the size of the luminance value differences and produce downscaled luminance value differences T$_{diff\_DS}$. Again, any suitable downscaling can be used here (such as downscaling by a factor of four), although no downscaling may be needed.

A sum/cap function 2308 receives the downscaled luminance value differences Y$_{diff\_DS}$ and the chrominance value differences U$_{diff}$ and V$_{diff}$ and operates to generate the difference map, which identifies the differences between the image frames. The sum/cap function 2308 can use the downscaled luminance value differences Y$_{diff\_DS}$ and chrominance value differences U$_{diff}$ and V$_{diff}$ in any suitable manner to generate the difference map. In some embodiments, the sum/cap function 2308 generates the difference map by performing the following calculation, although other suitable calculations could also occur.

$$Diff=(Y_{diff\_DS}+(U_{diff}+V_{diff})/2)^2 \quad (2)$$

$$Diff\_map=Diff*(Y_{ref}<Sat\_Thr) \quad (3)$$

where Diff_map represents the difference map pixel values and Sat_Thr represents a saturation threshold.

The difference map is provided to a low-pass filter (LPF)/divide function 2310, which also receives the norm map and two scalar values. One scalar value represents a reference weight Ref_weight, and the other scalar value represents a weight multiplier W_mult. The low-pass filter/divide function 2310 uses the difference map, norm map, and scalar values to generate the motion map, which identifies areas in the image frames where motion is occurring. The low-pass filter/divide function 2310 can use the difference map, norm map, and scalar values in any suitable manner to generate the motion map. In some embodiments, the low-pass filter/divide function 2310 generates the motion map by calculating the following, although other suitable calculations could also occur.

$$Filt\_Mot=LPF(Diff\_map)/Norm\_map \quad (4)$$

$$Deghost\_map=Ref\_weight-min(Ref\_weight,\ Filt\_Mot*W\_mult) \quad (5)$$

where Deghost_map represents the motion map pixel values and LPF( ) represents a filtering function. The reference weight Ref_weight here defines the maximum value that the motion map pixels can obtain. The weight multiplier W_mult here defines the value that the Flit_Mot value is multiplied by in order to identify the amount to subtract from the reference weight Ref_weight when motion is present. Larger values of the weight multiplier W_mult therefore result in larger values subtracted from the reference weight Ref_weight, resulting in more motion being detected.

Note that the process shown in FIGS. 19, 20, 21, 22, and 23 can be repeated for each non-reference image frame in the collection of aligned image frames, typically using the same image frame from the collection as the reference image frame. The results from performance of the process in FIGS. 19, 20, 21, 22, and 23 is ideally a set of motion maps 1906 that identify all of the motion between the non-reference image frames and the reference image frame (or at least all motion exceeding a threshold).

Although FIG. 16 illustrates one example of a process 1600 for deblurring multiple image frames and FIGS. 17 through 23 illustrate examples of operations in the process 1600 of FIG. 16, various changes may be made to FIGS. 16 through 23. For example, while shown as sequences of steps, various operations shown in FIGS. 16 through 23 could overlap, occur in parallel, occur in a different order, or occur any number of times. Also, the specific operations shown in FIGS. 17 through 23 are examples only, and other techniques could be used to perform each of the operations shown in FIGS. 17 through 23.

It should be noted that the operations shown in FIGS. 16 through 23 can be implemented in an electronic device 101 in any suitable manner. For example, in some embodiments, the operations shown in FIGS. 16 through 23 can be implemented or supported using one or more software applications or other software instructions that are executed by the processor 120 of the electronic device 101. In other embodiments, at least some of the operations shown in FIGS. 16 through 23 can be implemented or supported using dedicated hardware components. In general, the operations shown in FIGS. 16 through 23 can be performed using any suitable hardware or any suitable combination of hardware and software/firmware instructions.

It should also be noted that the operations shown in FIGS. 16 through 23 are described above as being performed using a specific implementation of the electronic device 101, but a number of modifications can be made based on the actual electronic device 101 being used. For example, the electronic device 101 could include or use a single camera or multiple cameras. If a single camera is used, multiple images of a scene could be captured sequentially, such as in one or more fast bursts. If multiple cameras are used, it may be possible to capture multiple images concurrently or in an overlapping manner, such as by capturing multiple images of a scene at the same time but with different camera exposures using different cameras. Some specific examples of multi-camera setups include the use of wide and telephoto cameras, wide and mono-focal cameras, or wide, telephoto, and monofocal cameras. Note that additional processing can occur to deal with baseline differences between the cameras. If needed, multiple images of the scene could still be captured sequentially using at least one of the multiple cameras. Assuming the geometry of the multiple cameras is known ahead of time, this geometry can be used to help align the images captured by the cameras or perform other functions. As another example, the electronic device 101 is described above as performing various operations using YUV image data. However, data in other domains (such as RGB data) could also be used or processed. As a third example, the techniques described in this patent document could be combined with conventional HDR image processing algorithms, such as in a software library used by the electronic device 101. This may allow a user of the electronic device 101 to select between different image processing algorithms, such as based on the specific situation or based on user preference. As a fourth example, the electronic device 101 can use the techniques described above to support the capture of still images or video sequences of scenes. The capture settings for a video sequence can be alternated to provide image frames with different exposures, and a high-frame rate capture capability can help to mask frame rate reductions due to frame selection. As a fifth example, the electronic device 101 could include an inertial measurement unit as noted above, and the inertial measurement unit can provide input to the deblurring operation 1608.

In addition, it should be noted that this disclosure has described both (i) techniques for convolutional neural network-based multi-exposure fusion of multiple image frames and (ii) techniques for deblurring multiple image frames. However, there is no requirement that these techniques be used together in the same electronic device 101. An electronic device 101 could be implemented using either a technique for convolutional neural network-based multi-exposure fusion of multiple image frames or a technique for deblurring multiple image frames (but not both). Of course, both could also be implemented in the same electronic device 101.

Figure 24:
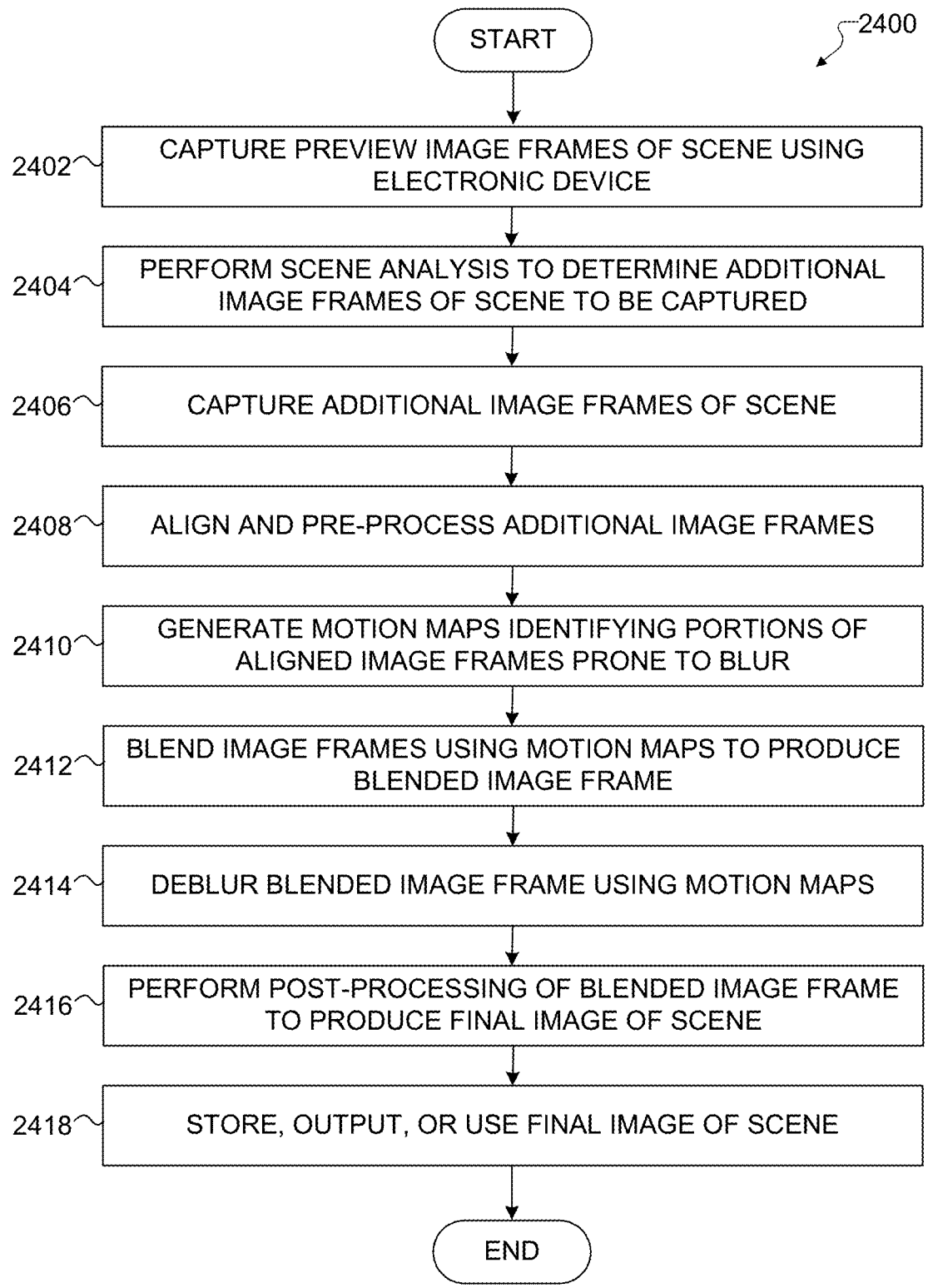
FIG. 24 illustrates an example method for deblurring multiple image frames in accordance with this disclosure.

FIG. 24 illustrates an example method 2400 for deblurring multiple image frames in accordance with this disclosure. For ease of explanation, the method 2400 shown in FIG. 24 is described as involving the use of the electronic device 101 of FIG. 1. However, the method 2400 shown in FIG. 24 could be used with any other suitable electronic device and in any suitable system.

As shown in FIG. 24, one or more preview images of a scene are captured using an electronic device at step 2402. This could include, for example, the processor 120 of the electronic device 101 causing the image sensor 1602 to capture the preview images of the scene. Scene analysis is performed to determine additional image frames to be captured of the scene at step 2404. This could include, for example, the processor 120 of the electronic device 101 performing the scene analysis operation 1604 to identify a number of additional images to be captured and the exposures to be used when capturing the additional images. The additional image frames of the scene are captured at step 2406. This could include, for example, the processor 120 of the electronic device 101 receiving a capture request and causing the image sensor 1602 to capture the additional images of the scene at the identified exposures.

The additional images are aligned and pre-processed at step 2408. This could include, for example, the processor 120 of the electronic device 101 selecting one of the additional image frames as a reference frame and aligning the non-reference image frames to the reference frame both geometrically and photometrically. Motion maps identifying portions of the aligned image frames that are prone to blur are generated at step 2410. This could include, for example, the processor 120 of the electronic device 101 performing the motion map generation operation 1708 to generate motion maps identifying motion between the reference frame and the non-reference frames. The image frames are blended using the motion maps to produce a blended image at step 2412. This could include, for example, the processor 120 of the electronic device 101 performing the blending operation 1710 to combine the aligned image frames based on the motion maps.

The blended image frame is deblurred using the motion maps at step 2414. This could include, for example, the processor 120 of the electronic device 101 performing the deblurring operation 1712 to deblur the blended image frame. The motion maps can be used here to limit the portions of the blended image frame that are processed by the deblurring operation 1712, such as by limiting the deblurring to only those portions where motion is identified by the motion maps.

Any desired post-processing of the blended image frame occurs at step 2416. This could include, for example, the processor 120 of the electronic device 101 performing a motion-compensated noise filtering operation 1714. The output of the post-processing is a final image of the scene, which can be stored, output, or used in some manner at step 2418. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 24 illustrates one example of a method 2400 for deblurring multiple image frames, various changes may be made to FIG. 24. For example, while shown as a series of steps, various steps in FIG. 24 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining multiple image frames of a scene using at least one camera of an electronic device;
using a convolutional neural network to generate blending maps associated with the image frames, wherein the blending maps contain or are based on both (i) a measure of motion in the image frames and (ii) a measure of how well exposed different portions of the image frames are; and
generating a final image of the scene by blending at least some of the image frames based on at least some of the blending maps.

2. The method of claim 1, wherein the final image of the scene includes image details that are lost in at least one of the image frames due to over-exposure or under-exposure.

3. The method of claim 1, wherein the convolutional neural network performs multiple convolution and pooling operations, multiple upsampling and decoding operations, and a final convolution operation to generate the blending maps.

4. The method of claim 1, wherein:
inputs to the convolutional neural network are image patches from the image frames, each image patch having multiple color channels;
the image patches are concatenated along the color channels to increase a number of inputs;
outputs from the convolutional neural network are blending map patches, each blending map patch having a single weight channel; and
multiple blending map patches are combined along the weight channels to produce the blending maps.

5. The method of claim 1, wherein the convolutional neural network is configured to:
extract scene contents from at least part of the image frames;
spatially downsize feature maps associated with the scene contents;
merge the downsized feature maps;
upsample the merged feature maps; and
translate the merged feature maps into the blending maps.

6. The method of claim 1, wherein the convolutional neural network is trained by:
obtaining multiple initial images of different scenes;
generating additional images of the scenes by transforming the initial images to simulate motion within the different scenes;
generating ground truth blending maps using the initial images and the additional images; and
using the initial images, the additional images, and the ground truth blending maps to train the convolutional neural network.

7. The method of claim 1, wherein the convolutional neural network is trained by:
obtaining multiple initial images at different camera exposures and ground truth blending maps for the initial images;
dividing the initial images and the associated ground truth blending maps into a training set, a validation set, and a testing set;
identifying image patches in the images of the training and validation sets and corresponding ground truth training patches in the ground truth blending maps of the training and validation sets;
repeatedly (i) training the convolutional neural network using the image patches and the ground truth training patches of the training set and (ii) validating the trained convolutional neural network using the image patches and the ground truth training patches of the validation set;
identifying testing patches in the initial images and the associated ground truth blending maps of the testing set; and
using the testing patches in the initial images and the associated ground truth blending maps of the testing set to test the trained and validated convolutional neural network.

8. The method of claim 1, wherein the multiple image frames of the scene capture motion in the scene.

9. An electronic device comprising:
at least one camera; and
at least one processing device configured to:
obtain multiple image frames of a scene using the at least one camera;
use a convolutional neural network to generate blending maps associated with the image frames, wherein the blending maps contain or are based on both (i) a measure of motion in the image frames and (ii) a measure of how well exposed different portions of the image frames are; and
generate a final image of the scene by blending at least some of the image frames based on at least some of the blending maps.

10. The electronic device of claim 9, wherein the final image of the scene includes image details that are lost in at least one of the image frames due to over-exposure or under-exposure.

11. The electronic device of claim 9, wherein the convolutional neural network is configured to perform multiple convolution and pooling operations, multiple upsampling and decoding operations, and a final convolution operation to generate the blending maps.

12. The electronic device of claim 9, wherein:
inputs to the convolutional neural network are image patches from the image frames, each image patch having multiple color channels;
the image patches are concatenated along the color channels to increase a number of inputs;
outputs from the convolutional neural network are blending map patches, each blending map patch having a single weight channel; and
multiple blending map patches are combined along the weight channels to produce the blending maps.

13. The electronic device of claim 9, wherein the convolutional neural network is configured to:
extract scene contents from at least part of the image frames;
spatially downsize feature maps associated with the scene contents;
merge the downsized feature maps;
upsample the merged feature maps; and
translate the merged feature maps into the blending maps.

14. The electronic device of claim 9, wherein the convolutional neural network is trained by:
- obtaining multiple initial images of different scenes;
- generating additional images of the scenes by transforming the initial images to simulate motion within the different scenes;
- generating ground truth blending maps using the initial images and the additional images; and
- using the initial images, the additional images, and the ground truth blending maps to train the convolutional neural network.

15. The electronic device of claim 9, wherein the convolutional neural network is trained by:
- obtaining multiple initial images at different camera exposures;
- generating ground truth blending maps for the initial images;
- dividing the initial images and the associated ground truth blending maps into a training set, a validation set, and a testing set;
- identifying image patches in the images of the training set and corresponding ground truth training patches in the ground truth blending maps of the training set;
- training the convolutional neural network using the image patches and the ground truth training patches;
- using the initial images and the associated ground truth blending maps in the validation set to validate the trained convolutional neural network;
- identifying testing patches in the initial images and the associated ground truth blending maps in the testing set; and
- using the testing patches in the initial images and the associated ground truth blending maps in the testing set to test the trained and validated convolutional neural network.

16. The electronic device of claim 9, wherein the multiple image frames of the scene capture motion in the scene.

17. A non-transitory machine-readable medium containing instructions that when executed cause at least one processor of an electronic device to:
- obtain multiple image frames of a scene using at least one camera of the electronic device;
- use a convolutional neural network to generate blending maps associated with the image frames, wherein the blending maps contain or are based on both (i) a measure of motion in the image frames and (ii) a measure of how well exposed different portions of the image frames are; and
- generate a final image of the scene by combining at least some of the image frames based on at least some of the blending maps.

18. The non-transitory machine-readable medium of claim 17, wherein the final image of the scene includes image details that are lost in at least one of the image frames due to over-exposure or under-exposure.

19. The non-transitory machine-readable medium of claim 17, wherein the convolutional neural network performs multiple convolution and pooling operations, multiple upsampling and decoding operations, and a final convolution operation to generate the blending maps.

20. The non-transitory machine-readable medium of claim 19, wherein:
- inputs to the convolutional neural network are image patches from the image frames, each image patch having multiple color channels;
- the image patches are concatenated along the color channels to increase a number of inputs;
- outputs from the convolutional neural network are blending map patches, each blending map patch having a single color channel; and
- multiple blending map patches are combined along the color channels to produce the blending maps.

21. The non-transitory machine-readable medium of claim 17, wherein the convolutional neural network is trained by:
- obtaining multiple initial images of different scenes;
- generating additional images of the scenes by transforming the initial images to simulate motion within the different scenes;
- generating ground truth blending maps using the initial images and the additional images; and
- using the initial images, the additional images, and the ground truth blending maps to train the convolutional neural network.

22. The non-transitory machine-readable medium of claim 17, wherein the convolutional neural network is trained by:
- obtaining multiple initial images at different camera exposures;
- generating ground truth blending maps for the initial images;
- dividing the initial images and the associated ground truth blending maps into a training set, a validation set, and a testing set;
- identifying image patches in the images of the training set and corresponding ground truth training patches in the ground truth blending maps of the training set;
- training the convolutional neural network using the image patches and the ground truth training patches;
- using the initial images and the associated ground truth blending maps in the validation set to validate the trained convolutional neural network;
- identifying testing patches in the initial images and the associated ground truth blending maps in the testing set; and
- using the testing patches in the initial images and the associated ground truth blending maps in the testing set to test the trained and validated convolutional neural network.

23. The non-transitory machine-readable medium of claim 17, wherein the multiple image frames of the scene capture motion in the scene.

\* \* \* \* \*